(12) United States Patent
Fukuda et al.

(10) Patent No.: US 10,316,493 B2
(45) Date of Patent: Jun. 11, 2019

(54) HYDRAULIC SYSTEM AND WORKING MACHINE INCLUDING THE SAME

(71) Applicant: KUBOTA CORPORATION, Osaka-shi (JP)

(72) Inventors: Yuji Fukuda, Sakai (JP); Hiroaki Nakagawa, Sakai (JP); Kazuyoshi Arii, Sakai (JP); Keisuke Miura, Sakai (JP); Ryosuke Kinugawa, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 448 days.

(21) Appl. No.: 14/987,765

(22) Filed: Jan. 5, 2016

(65) Prior Publication Data

US 2016/0230370 A1 Aug. 11, 2016

(30) Foreign Application Priority Data

Feb. 6, 2015 (JP) .................................. 2015-022218
Sep. 28, 2015 (JP) .................................. 2015-190458

(51) Int. Cl.
| F15B 11/16 | (2006.01) |
| E02F 9/22 | (2006.01) |
| F16H 61/4008 | (2010.01) |
| F16H 61/44 | (2006.01) |

(52) U.S. Cl.
CPC ............ *E02F 9/2225* (2013.01); *E02F 9/226* (2013.01); *E02F 9/2228* (2013.01); *E02F 9/2246* (2013.01); *E02F 9/2253* (2013.01); *E02F 9/2289* (2013.01); *E02F 9/2296* (2013.01); *F15B 11/166* (2013.01); *F16H 61/4008* (2013.01); *F16H 61/44* (2013.01); *F15B 2211/3058* (2013.01); *F15B 2211/3127* (2013.01); *F15B 2211/329* (2013.01); *F15B 2211/355* (2013.01); *F15B 2211/6355* (2013.01); *F15B 2211/67* (2013.01)

(58) Field of Classification Search
CPC ....... E02F 9/2225; E02F 9/2296; E02F 9/128; E02F 9/2246; F16H 61/44; F16H 61/4157; F16H 61/4008; F16D 2121/02; B60T 13/22; F15B 11/166
See application file for complete search history.

(56) References Cited

U.S. PATENT DOCUMENTS 8,776,512 B2 * 7/2014 Lastre ...................... B60T 7/12
                                                    60/436
9,316,310 B2 * 4/2016 Kinugawa ............. F16H 61/421

FOREIGN PATENT DOCUMENTS

| JP | H2-66703 U | 5/1990 |
| JP | H3-365 U | 1/1991 |
| JP | 2002-030883 | 1/2002 |
| JP | 2012-144141 | 8/2012 |
| JP | 2013-036276 | 2/2013 |

* cited by examiner

*Primary Examiner* — Abiy Teka
(74) *Attorney, Agent, or Firm* — Mori & Ward, LLP

(57) ABSTRACT

A hydraulic system includes a hydraulic pump to discharge an operation fluid, a hydraulic device to be operated by the operation fluid, a plurality of hydraulic pressure controllers each to change an operation state of the hydraulic pressure controller based on a pressure of the operation fluid so as to control the hydraulic device, and a proportional valve connected to the plurality of hydraulic pressure controllers. The proportional valve is configured to set a pressure of the operation fluid supplied to the hydraulic pressure controllers.

8 Claims, 24 Drawing Sheets

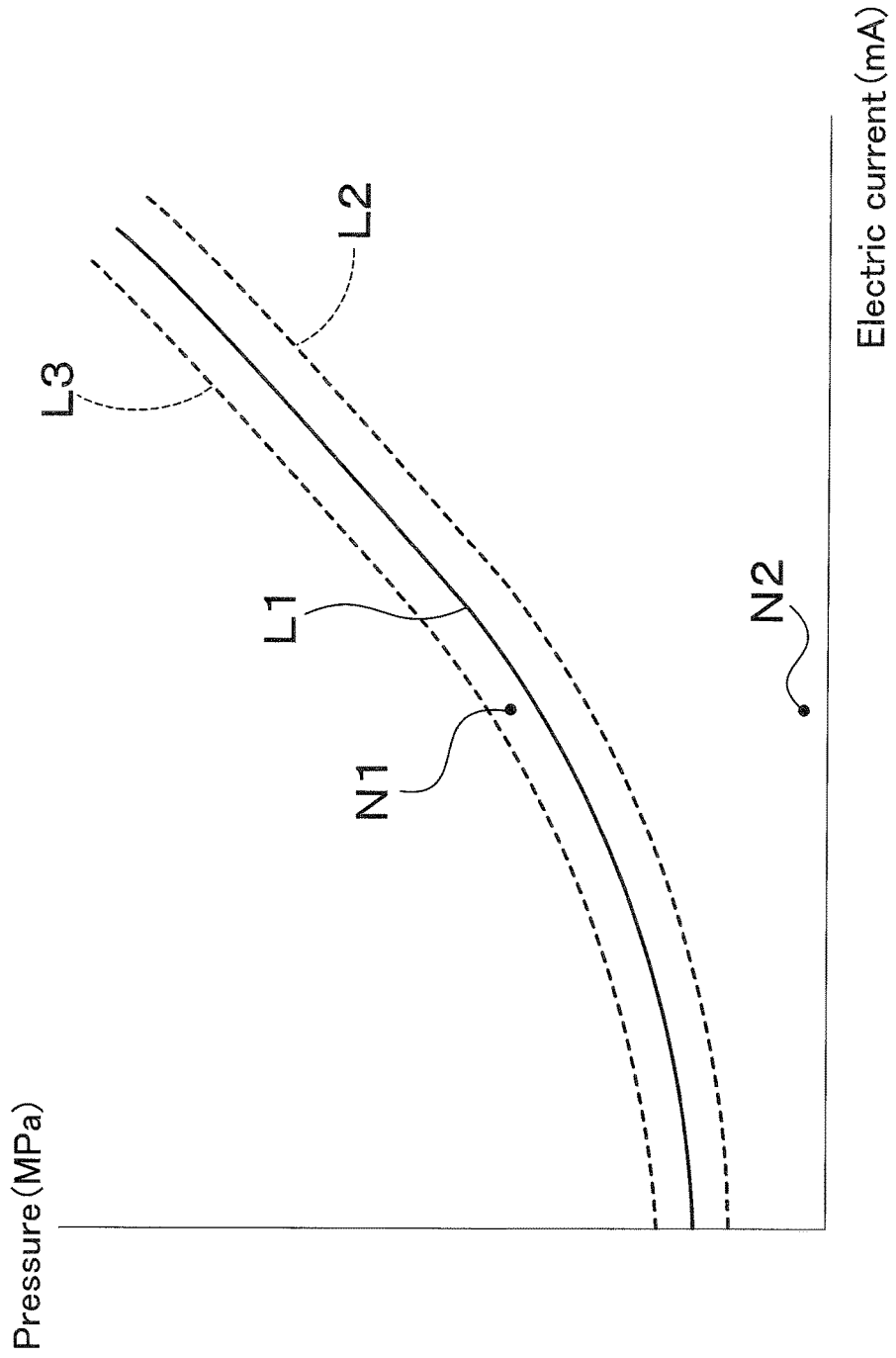

HYDRAULIC SYSTEM AND WORKING MACHINE INCLUDING THE SAME

CROSS-REFERENCE TO RELATED APPLICATIONS

The present application claims priority under 35 U.S.C. § 119 to Japanese Patent Application No. 2015-190458, filed Sep. 28, 2015 and to Japanese Patent Application No. 2015-022218, filed Feb. 6, 2015. The contents of these applications are incorporated herein by reference in their entirety.

BACKGROUND OF THE INVENTION

Field of the Invention

The present invention relates to a hydraulic system and a working machine including the hydraulic system.

Discussion of the Background

A hydraulic system configured to change traveling speeds of a working machine by using a hydraulic motor of a variable displacement type is previously known in a technical field of the working machine, such as a skid steer loader and a compact track loader (see Japanese Unexamined Patent Application Publication No. 2013-36276).

The hydraulic system disclosed in Japanese Unexamined Patent Application Publication No. 2013-36276 is a system configured to change traveling speeds of the working machine by using an axial motor of a variable displacement type (an HST motor), the axial motor employing a swash plate. The hydraulic system includes a speed change mechanism configured to change a speed of the HST motor. The speed change mechanism includes: a direction switch valve; a hydraulic pressure switch valve having a position, the position being switched by the direction switch valve; and a swash plate switch cylinder connected to the hydraulic pressure switch valve and to the HST motor. The speed change mechanism firstly changes the position of the hydraulic pressure switch valve by using the direction switch valve, thereby stretching and shortening the swash plate switch cylinder. The stretching and shortening of the swash plate switch cylinder changes an angle of the swash plate of the HST motor, and then the HST motor is switched to a first speed or to a second speed.

In addition, the hydraulic system includes a brake mechanism configured to brake the HST motor. The brake mechanism is a negative brake, and includes: a brake part configured to be activated by a pressured hydraulic fluid to brake the HST motor; and a brake release valve configured to release the braking caused by the brake part.

SUMMARY OF THE INVENTION

According to one aspect of the present invention, a hydraulic system includes a hydraulic pump to discharge an operation fluid, a hydraulic device to be operated by the operation fluid, a plurality of hydraulic pressure controllers each to change an operation state of the hydraulic pressure controller based on a pressure of the operation fluid so as to control the hydraulic device, and a proportional valve connected to the plurality of hydraulic pressure controllers. The proportional valve is configured to set a pressure of the operation fluid supplied to the hydraulic pressure controllers.

According to another aspect of the present invention, a hydraulic system includes a hydraulic pump to discharge an operation fluid, a hydraulic device to be operated by the operation fluid, a hydraulic pressure controller to change an operation state of the hydraulic pressure controller based on a pressure of the operation fluid so as to control the hydraulic device, an electromagnetic valve to set a pressure of the operation fluid supplied to the hydraulic pressure controller, a measurement device to measure a pressure of the operation fluid flowing from the electromagnetic valve to the hydraulic pressure controller, and a state judegment device to detect a state of the electromagnetic valve based on the pressure measured by the measurement device.

According to further aspect of the present invention, a working machine includes a hydraulic system. The hydraulic system includes a hydraulic pump to discharge an operation fluid, a hydraulic device to be operated by the operation fluid, a plurality of hydraulic pressure controllers each to change an operation state of the hydraulic pressure controller based on a pressure of the operation fluid so as to control the hydraulic device, and a proportional valve connected to the plurality of hydraulic pressure controllers. The proportional valve is configured to set a pressure of the operation fluid supplied to the hydraulic pressure controllers.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 16 is a view showing a relationship (a pressure-current characteristic) between a current value and an operation fluid;

DESCRIPTION OF THE EMBODIMENTS

Figure 1:
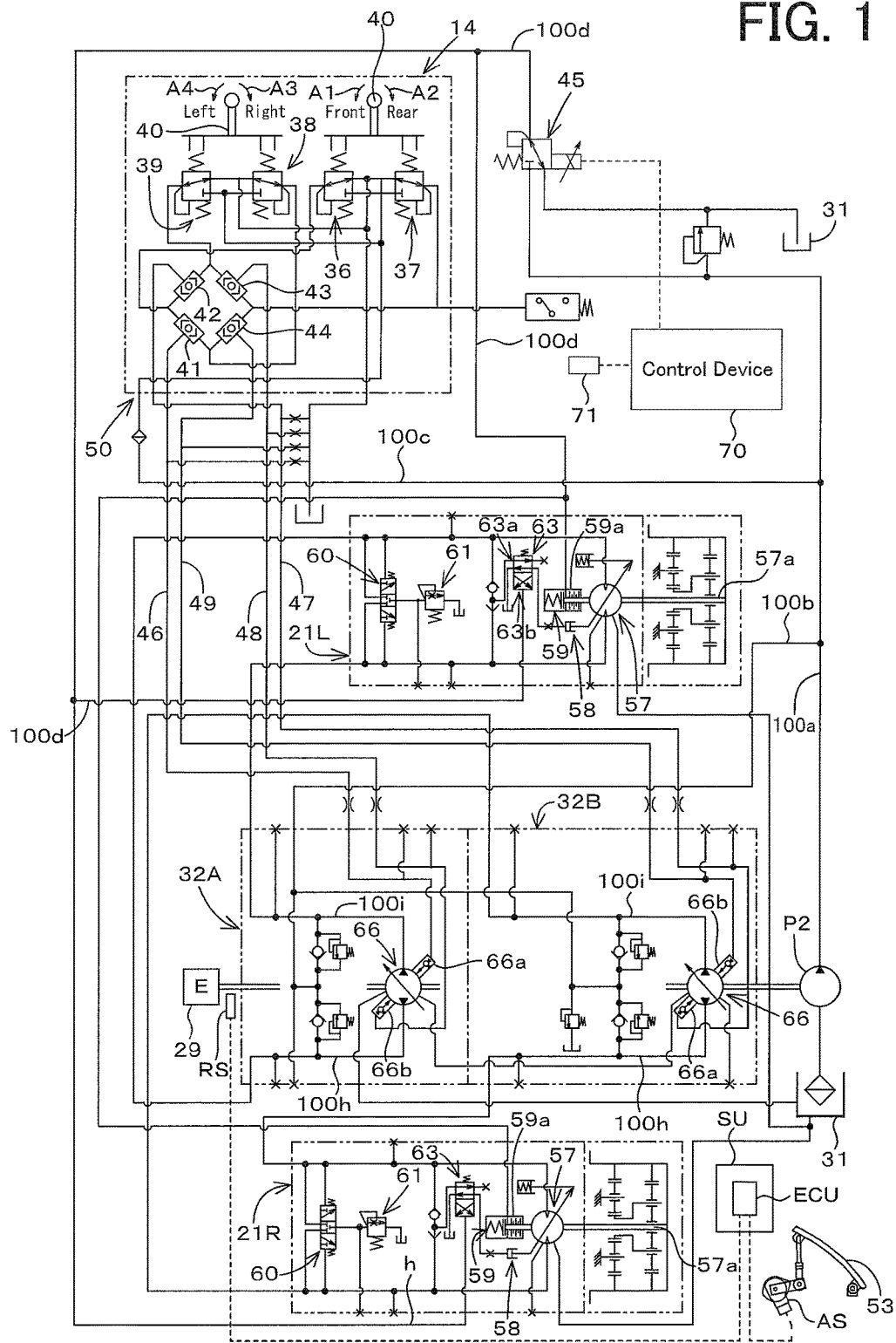
FIG. 1 is a view showing a hydraulic system (a hydraulic circuit) for a travel system according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

First Embodiment

Firstly, a whole configuration of a working machine according to a first embodiment of the present invention will be explained.

Figure 17:
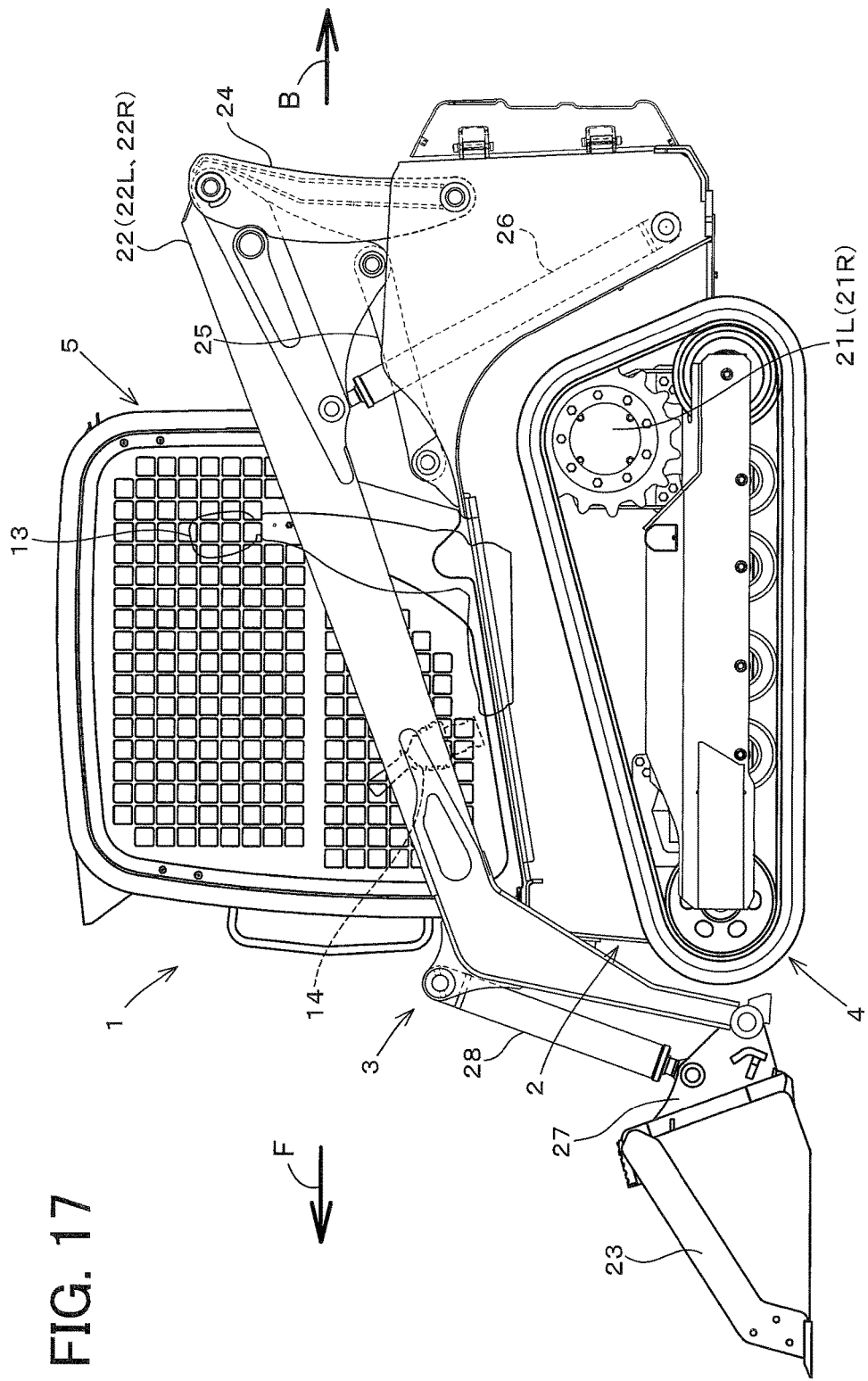
FIG. 17 is a side view showing a track loader as an example of a working machine according to the embodiments of the present invention.
Figure 18:
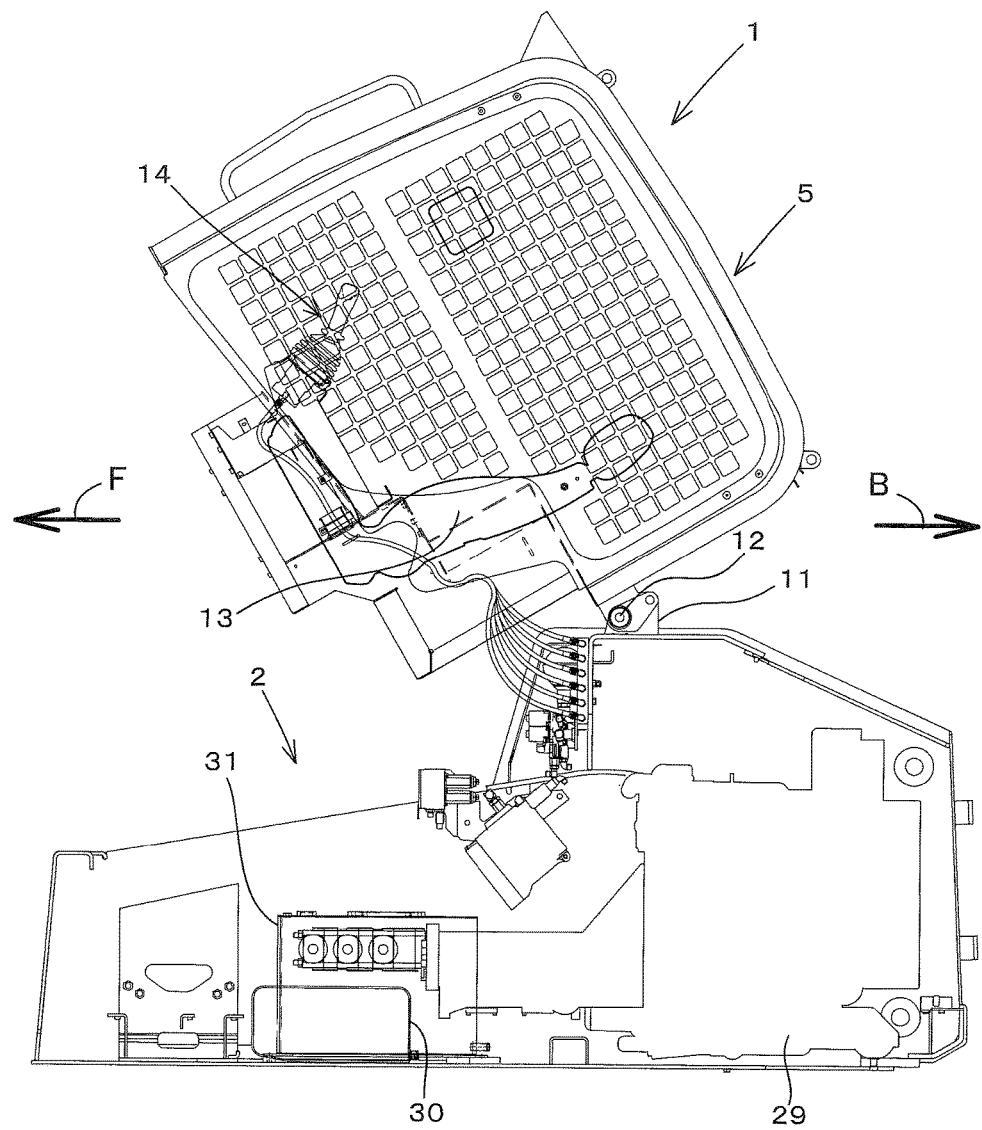
FIG. 18 is a side view showing a part of the track loader lifting a cabin upward.

As shown in FIG. 17 and FIG. 18, a working machine 1 according the first embodiment includes a machine frame 2, an operation device 3 attached on the machine frame 2, and a travel device 4 supporting the machine frame 2. FIG. 17 and FIG. 18 show a track loader as an example of the working machine 1; however, the working machine 1 according to the present embodiment is not limited to the track loader, and accordingly may be a tractor, a skid steer loader, a compact track loader, and a backhoe, for example. Hereinafter, in explanations of the embodiment of the present invention, a forward direction (a direction shown by an arrowed line F in FIG. 17) corresponds to a front side of an operator seating on an operator seat 13 of the working machine, a backward direction (a direction shown by an arrowed line B in FIG. 17) corresponds to a back side of the operator, a leftward direction (a direction vertically extending from a back surface to a front surface of FIG. 17) corresponds to a left side of the operator, and a rightward direction (a direction vertically extending from the front surface to the back surface of FIG. 17) corresponds to a right side of the operator.

A cabin 5 is mounted on a front portion of an upper portion of the machine frame 2. A rear portion of the cabin 5 is supported by a support bracket 11 of the machine frame 2, and thereby the cabin 5 is capable of freely turning about a support axis 12. A front portion of the cabin 5 is configured to be placed on the front portion of the machine frame 2.

The operator seat 13 is disposed inside the cabin 5. A travel operation device 14 is arranged on one side (for example, on the left side) of the operator seat 13, the travel operation device 14 being used for operating the travel device 4.

The travel device 4 is configured of a crawler travel device, for example. The travel device 4 is disposed on a left lower portion of the machine frame 2, and another travel device 4 is disposed on a right lower portion of the machine frame 2. The travel devices 4 include a first travel portion 21L and a second travel portion 21R, the first travel portion 21L and the second travel portion 21R being activated to be driven by a hydraulic pressure, and is configured to be traveled by the first travel portion 21L and the second travel portion 21R.

The operation device 3 includes a pair of booms 22 and a bucket 23 (an operation tool). One of the booms 22 is a boom 22R, and the other one of the booms 22 is a boom 22L. The bucket 23 is attached to tip portions of the booms 22. The boom 22L is arranged on the left of the machine frame 2. The boom 22R is arranged on the right of the machine frame 2. The boom 22R and the boom 22L are connected to each other by a connector (a connection member). The boom 22R and the boom 22L are supported by a first lift link 24 and a second lift link 25. A lift cylinder 26 is disposed on between a portion close to a base of the boom 22R and a rear lower portion of the machine frame 2, the lift cylinder 26 being configured of a double-acting hydraulic cylinder. Another lift cylinder 26 is disposed on between a base portion side of the boom 22L and the rear lower portion of the machine frame 2, the lift cylinder 26 being configured of a double-acting hydraulic cylinder. The simultaneous stretching and simultaneous shortening of the lift cylinders swing the boom 22R and the boom 22L upward and downward. An attachment bracket 27 is pivotally supported by the boom 22R at a portion close to a tip portion of the boom 22R, and is capable of freely turning about a horizontal direction. Another attachment bracket 27 is pivotally supported by the boom 22L at a portion close to a tip portion of the boom 22L, and is capable of freely turning about a horizontal direction. A back surface of the bucket 23 is attached to the attachment bracket 27 disposed on the right and to the attachment bracket 27 disposed on the left.

In addition, a tilt cylinder 28 is disposed between the attachment bracket 27 and an intermediate portion of a tip portion side of the boom 22R, the tilt cylinder 28 being configured of a double-acting hydraulic cylinder. Another tilt cylinder 28 is disposed between the attachment bracket 27 and an intermediate portion of a tip portion side of the boom 22L, the tilt cylinder 28 being configured of a double-acting hydraulic cylinder. Stretching and shortening of the tilt cylinders 28 swing the bucket 23 (a shoveling movement and a dumping movement).

The bucket 23 is configured to be freely attachable to and detachable from the attachment bracket 27. Various types of attachments (a hydraulically-actuated operation tool having a hydraulic actuator described below) can be attached to the attachment bracket 27 when the bucket 23 is detached from the attachment bracket 27, and thus the working machine 1 is configured to perform various types of operations other than a excavating operation (or another excavating operation).

An engine 29 is disposed on a rear portion of a bottom wall 6 of the machine frame 2. A fuel tank 30 and an operation fluid tank 31 are disposed on a front portion of the bottom wall 6 of the machine frame 2.

Next, a hydraulic system for the working machine 1 according to the embodiment will be explained.

Figure 2:
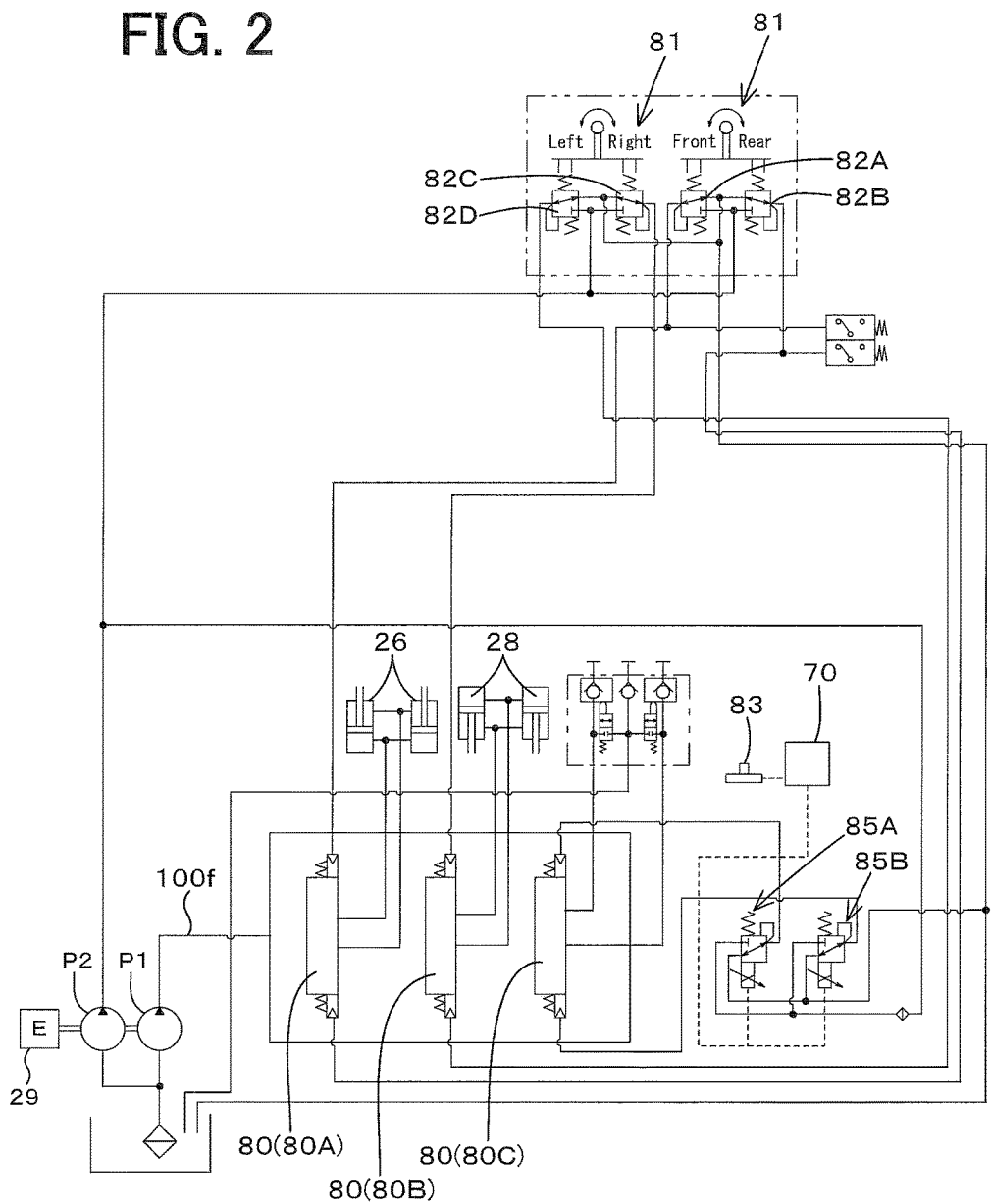
FIG. 2 is a view showing a hydraulic system (a hydraulic circuit) for an operation system according to the first embodiment.

FIG. 1 shows a whole view of the hydraulic system for a travel system. FIG. 2 shows a whole view of the hydraulic system for an operation system.

The hydraulic system for the travel system will be explained firstly.

As shown in FIG. 1 and FIG. 2, the hydraulic system (a hydraulic circuit) includes a first pump P1 and a second pump P2. The first pump P1 and the second pump P2 are hydraulic pumps configured to be driven by a motive force of the engine 29 and thus to discharge a hydraulic operation fluid (an operation oil). Each of the first pump P1 and the second pump P2 is configured of a gear pump of a constant displacement type, for example.

The first pump P1 (for example, a main pump) is used for driving the lift cylinder 26, the tilt cylinder 28, or a hydraulic actuator of the attachment attached to the tip portion of the boom 22. The second pump P2 (for example, a pilot pump and a charge pump) is mainly used for supplying a control signal (a pilot pressure). For convenience in the following explanation, the hydraulic fluid (the hydraulic oil) discharged from the second pump (second hydraulic pump) P2 is referred to as a pilot pressure, the hydraulic fluid (the hydraulic oil) serving as the control signal is also referred to as the pilot pressure, and a pressure of the pilot fluid (the hydraulic oil) is referred to as a pilot pressure.

As shown in FIG. 1, the hydraulic system (the hydraulic circuit) includes a first drive circuit 32A and a second drive circuit 32B. The first drive circuit 32A is a circuit configured to drive the first travel portion 21L disposed on the left, and the second drive circuit 32B is a circuit configured to drive the second travel portion 21R disposed on the right.

The first drive circuit 32A includes HST pumps (hydraulic pumps for traveling) 66. One of the HST pumps 66 is connected to an HST motor 57 of the corresponding first travel portion 21L by a pair of speed-changing fluid tubes (speed-changing fluid paths) 100$h$ and 100$i$. The other one of the HST pumps 66 is connected to another HST motor 57 of the corresponding second travel portion 21R by another pair of speed-changing fluid tubes (speed-changing fluid paths) 100$h$ and 100$i$. Meanwhile, the second drive circuit 32B has a configuration similar to the configuration of the first drive circuit 32A, and accordingly the explanation of the second drive circuit 32B is omitted.

The HST pump 66 is a variable displacement axial pump employing a swash plate, the variable displacement axial pump being configured to be driven by a motive power of the engine 29, and is a hydraulic pump (a variable displacement hydraulic pump employing a swash plate) of a pilot control type, the hydraulic pump being configured to change an angle of the swash plate by using the pilot pressure. In particular, the HST pump 66 includes a forward travel pressure receiver 66$a$ and a backward travel pressure receiver 66$b$, and the pilot pressure is applied to the forward travel pressure receiver 66$a$ and the backward travel pressure receiver 66$b$.

The angles of the swash plates are changed by the pilot pressures applied to the pressure receivers 66$a$ and 66$b$. The changes of the angles of the swash plates change a discharge direction of and a discharge amount of the hydraulic fluid (the hydraulic oil), thereby changing a revolution output power of the first travel portion 21L and a revolution output power of the second travel portion 21R.

When a revolution speed of the HST pump 66 is increased, the discharge amount of the HST pump 66 is increased, thereby increasing a travel speed. A revolution speed of the HST pump 66, that is, the discharge amount of the HST pump 66 is changed on the basis of an output of the engine 29. The working machine 1 includes an acceleration operation member (an acceleration pedal or an acceleration lever) 53. When an operation amount of the acceleration operation member 53 is zero (0), the revolution speed of the engine 29 is an idling revolution speed (for example, 1150 rpm). Meanwhile, when the acceleration operation member 53 is fully operated to the maximum extent, the revolution speed of the engine 29 is increased to the maximum revolution speed (for example, 2480 rpm).

The revolution speed of the engine is controlled by, for example, an electronically-controlled fuel supply unit SU of a common rail type. The electronically-controlled fuel supply unit SU includes a common rail, a supply pump, an injector, and a controller ECU. The common rail is configured of a cylindrical tube for accumulating fuel. The supply pump is configured to supply the fuel to the common rail after highly compressing the fuel stored in the fuel tank 30. The injector is configured to inject the highly compressed fuel into cylinders of the engine 29, the fuel being accumulated in the common rail. The controller ECU is configured to control the injector, thereby controlling an amount of fuel injection from the injector.

An acceleration sensor AS and a revolution sensor RS are connected to the controller ECU via a transmission tube (a transmission path), the acceleration sensor AS being configured to detect an operation amount of the acceleration operation member 53, the revolution sensor RS being configured to detect an actual revolution speed of the engine 29 (an actual engine revolution speed). Signals (detection signals) detected by the acceleration sensor AS and the revolution sensor RS are inputted to the controller ECU.

Then, the controller ECU control the amount of fuel injection from the injector on the basis of the detection signals of the acceleration sensor AS and the revolution sensor RS, thereby operating the engine 29 at a revolution speed (a target engine revolution speed) corresponding to the operation amount of the acceleration operation member 53 (determined by the acceleration operation member 53).

Meanwhile, as shown in FIG. 1, a discharge fluid tube (discharge fluid path) 100$a$ is connected to a discharge port of the second pump P2, the discharge fluid tube 100$a$ being configured to distribute a discharged oil (the pilot fluid) discharged from the second pump P2.

A first supply tube (first supply path) 100$b$ and a second supply tube (second supply path) 100$c$ are branched from the discharge fluid tube 100$a$. A pump port 50 of the travel operation device 14 is connected to the second supply tube 100$c$. Thus, the pilot fluid, the discharged oil from the second pump P2, flows through the second supply tube 100$c$ to be supplied to the travel operation device 14.

The travel operation device 14 includes: a remote control valve 36 for forward travel (a forward travel remote control valve 36); a remote control valve 37 for backward travel (a backward travel remote control valve 37); a remote control valve 38 for right turn (a right turn remote control valve 38); a remote control valve 39 for left turn (a left turn remote control valve 39); a travel lever 40, and first to fourth shuttle valves 41, 42, 43, and 44. Each of the remote control valves 36, 37, 38, and 39 is commonly operated, that is, operated by a single travel lever 40. The remote control valves 36, 37, 38, and 39 change pressures of the operation fluid on the basis of operation of the travel lever 40 (an operation member) and supply the operation fluid of the changed pressure to a hydraulic pressure control part and the like.

The travel lever 40 is configured to be tilted to a forward direction, to a backward direction, to a width direction perpendicular to the forward direction and to the backward direction, and to a diagonal direction. The tilting of the travel lever 40 operates each of the remote control valves 36, 37, 38, and 39 of the travel operation device 14. After that, the pilot pressures are outputted from secondary ports of the remote control valves 36, 37, 38, and 39, the pilot pressures being proportional to an operation amount of the travel lever 40 from a neutral position.

When the travel lever 40 is tilted to the forward direction (to a direction shown by an arrowed line A1 in FIG. 1), the forward travel remote control valve 36 is operated, thereby outputting the pilot pressure from the remote control valve 36. The pilot pressure is applied to the forward travel pressure receiver 66a of the first drive circuit 32A through a first flow tube (first flow path) 46 from the first shuttle valve 41 and is applied to the forward travel pressure receiver 66a of the second drive circuit 32B through a second flow tube (second flow path) 47 from the second shuttle valve 42. In this manner, output shafts 57a of the first travel portion 21L and the second travel portion 21R normally revolve (revolve forward) at a speed proportional to an amount of the tilting of the travel lever 40, and thereby the track loader 1 travels forward and straight.

In addition, when the travel lever 40 is tilted to the backward direction (to a direction shown by an arrowed line A2 in FIG. 1), the backward travel remote control valve 37 is operated, thereby outputting the pilot pressure from the remote control valve 37. The pilot pressure is applied to the backward travel pressure receiver 66b of the first drive circuit 32A through a third flow tube (third flow path) 48 from the third shuttle valve 43 and is applied to the backward travel pressure receiver 66b of the second drive circuit 32B through a fourth flow tube (fourth flow path) 49 from the fourth shuttle valve 44. In this manner, output shafts 57a of the first travel portion 21L and the second travel portion 21R reversely revolve (revolve backward) at a speed proportional to an amount of the tilting of the travel lever 40, and thereby the track loader 1 travels backward and straight.

Moreover, when the travel lever 40 is tilted to the rightward direction (to a direction shown by an arrowed line A3 in FIG. 1), the right turn remote control valve 38 is operated, thereby outputting the pilot pressure from the remote control valve 38. The pilot pressure is applied to the forward travel pressure receiver 66a of the first drive circuit 32A through the first flow tube (first flow path) 46 from the first shuttle valve 41 and is applied to the backward travel pressure receiver 66b of the second drive circuit 32B through the fourth flow tube (fourth flow path) 49 from the fourth shuttle valve 44. In this manner, the output shaft 57a of the first travel portion 21L normally revolve (revolve forward), the output shaft 57a of the second travel portion 21R reversely revolve (revolve backward), and thereby the track loader 1 turns rightward.

Furthermore, when the travel lever 40 is tilted to the leftward direction (to a direction shown by an arrowed line A4 in FIG. 1), the left turn remote control valve 39 is operated, thereby outputting the pilot pressure from the remote control valve 39. The pilot pressure is applied to the forward travel pressure receiver 66a of the second drive circuit 32B through the second flow tube (second flow path) 47 from the second shuttle valve 42 and is applied to the backward travel pressure receiver 66b of the first drive circuit 32A through the third flow tube (third flow path) 48 from the third shuttle valve 43. In this manner, the output shaft 57a of the second travel portion 21R normally revolve (revolve forward), the output shaft 57a of the first travel portion 21L reversely revolve (revolve backward), and thereby the track loader 1 turns leftward.

In addition, when the travel lever 40 is tilted to the diagonal direction, a differential pressure between the pilot pressures applied to the forward travel pressure receiver 66a and the backward travel pressure receiver 66b determines the revolution direction of and the revolution speed of the output shaft 57a of the first travel portion 21L, the forward travel pressure receiver 66a and the backward travel pressure receiver 66b being included in the first drive circuit 32A, and a differential pressure between the pilot pressures applied to the forward travel pressure receiver 66a and the backward travel pressure receiver 66b determines the revolution direction of and the revolution speed of the output shaft 57a of the second travel portion 21R, the forward travel pressure receiver 66a and the backward travel pressure receiver 66b being included in the second drive circuit 32B, thereby the track loader 1 turns rightward or leftward traveling forward or backward.

That is, when the travel lever 40 is operated to be tilted diagonally leftward to the forward direction, the track loader 1 travels forward turning leftward at a speed corresponding to a tilt angle of the travel lever 40. When the travel lever 40 is operated to be tilted diagonally rightward to the forward direction, the track loader 1 travels forward turning rightward at a speed corresponding to a tilt angle of the travel lever 40. When the travel lever 40 is operated to be tilted diagonally leftward to the backward direction, the track loader 1 travels backward turning leftward at a speed corresponding to a tilt angle of the travel lever 40. When the travel lever 40 is operated to be tilted diagonally rightward to the backward direction, the track loader 1 travels backward turning rightward at a speed corresponding to a tilt angle of the travel lever 40.

Each of the first travel portion 21L and the second travel portion 21R includes a travel motor 57 (for example, a motor for travel), a swash plate switch cylinder 58, a brake mechanism 59, a flushing valve 60, and a relief valve 61 for flushing.

The travel motor 57 is an HST motor, that is, a hydraulic device configured to be operated by the pilot fluid (or the operation fluid). The travel motor 57 is an axial motor of a variable displacement type, the axial motor employing a swash plate and being configured to switch speeds of the travel motor 57 between two speeds, high and low, for example.

Then, the hydraulic circuit shown in FIG. 1 includes a plurality of hydraulic controllers configured to control the hydraulic devices. The hydraulic devices are devices configured to be operated by the operation fluid, that is, the travel motor 57 and the like in the travel system, for example. In the first embodiment, the hydraulic circuit includes two hydraulic controllers configured to control the travel motors. One of the hydraulic controllers is a first hydraulic pressure switch valve 63, and the other one of the hydraulic controllers is a brake mechanism 59d. Accordingly, the plurality of hydraulic controllers includes the first hydraulic pressure switch valve 63 and the brake mechanism 59.

The first hydraulic pressure switch valve 63 changes an operation state thereof on the basis of a pressure of the pilot fluid (the operation fluid), thereby controlling the speed of the travel motor 57. That is, the first hydraulic pressure switch valve 63 is a valve for switching the speeds of the travel motor 57.

The swash plate switch cylinder 58 is disposed on the hydraulic device, and is connected to the swash plate of the travel motor 57. When the operation state changes, the swash plate switch cylinder 58 is stretched to switch the angle of the swash plate of the travel motor 57. In this manner, the travel motor 57 changes the speed thereof to a first sped or to a second speed.

To be more detailed, the first hydraulic pressure switch valve 63 is a two-position switch valve having a spool configured to move between a first position 63a and a second position 63b depending on the pressure (the pilot pressure) of the pilot fluid. The spool of the first hydraulic pressure switch valve 63 moves to the second position 63b when the pilot pressure reaches a predetermined pressure, thereby changing the operation state of the travel motor 57. In addition, the spool of the first hydraulic pressure switch valve 63 is returned to the first position 63a by a spring when the pilot pressure is smaller than the predetermined pressure, thereby changing the operation state of the travel motor 57. In the state where the spool of the first hydraulic pressure switch valve 63 is moved to the first position 63a, the pilot fluid is released from the swash plate switch cylinder 58, and the swash plate switch cylinder 58 is shortened, thereby switching the travel motor 57 to the first speed. And, in the state where the spool of the first hydraulic pressure switch valve 63 is moved to the second position 63b, the pilot fluid is supplied to the swash plate switch cylinder 58, and the swash plate switch cylinder 58 is stretched, thereby switching the travel motor 57 to the second speed.

Meanwhile, the brake mechanism 59 changes an operation state thereof depending on the pressure of the pilot fluid (the operation fluid), and thus controls braking of the travel motor 57. That is, the brake mechanism 59 controls the braking of the travel motor 57.

The brake mechanism 59 changes an operation state thereof due to the pilot fluid (the operation fluid) discharged from the second pump P2. In particular, the brake mechanism 59 brakes the travel motor 57 in one operation state, and the brake mechanism 59 releases the braking of the travel motor 57 in another operation state. The brake mechanism 59 includes a first disk, a second disk, and a spring, for example. The first disk is disposed on the output shaft 57a of the travel motor 57. The second disk is movable. The spring is configured to push the second disk toward a side where the second disk is in contacted with the first disk. In addition, the brake mechanism 59 includes a housing portion (housing case) 59a configured to house the first disk, the second, disk, and the spring. A third supply tube (third supply path) 100d is connected to a portion housing the second disk in the housing portion 59a. When the pilot fluid is supplied to a storage portion of the housing portion 59a to apply a predetermined pressure into the storage portion, the second disk moves toward a side opposed to the braking side (toward a direction opposite to a direction of the pushing by the spring), thereby releasing the braking caused by the brake mechanism 59. On the other hand, when the pressure of the pilot fluid is smaller than the predetermined pressure in the storage portion of the housing portion 59a, the second disk moves toward a side where the second disk is in contact with the first disk, thereby braking the travel motor 57. The second travel portion 21R has a configuration similar to the configuration of the first travel portion 21L, and accordingly detailed drawings and explanations of the second travel portion 21R will be omitted.

As shown in FIG. 1, the hydraulic circuit includes a proportional valve 45. The proportional valve 45 is connected to the discharge fluid tube 100a, and thereby the pilot fluid (the operation fluid) discharged from the second pump P2 can pass through the proportional valve 45. In addition, the proportional valve 45 is connected to two hydraulic pressure controllers (the first hydraulic pressure switch valve 63 and the brake mechanism 59) through the third supply tube 100d. The proportional valve 45 is a valve configured to set a pressure of the pilot fluid (operation fluid) being to be supplied to the first hydraulic pressure switch valve 63 and the brake mechanism 59, that is, an electromagnetic proportional valve configured to change an aperture of valve by using magnetic excitation.

Changing of an aperture of the proportional valve 45 changes a flow rate of the pilot fluid, the pilot fluid flowing from the discharge fluid tube 100a to the third supply tube 100d. In particular, the changing of an aperture of the proportional valve 45 allows to change the pilot pressure applied to the first hydraulic pressure switch valve 63 and the brake mechanism 59.

Figure 3:
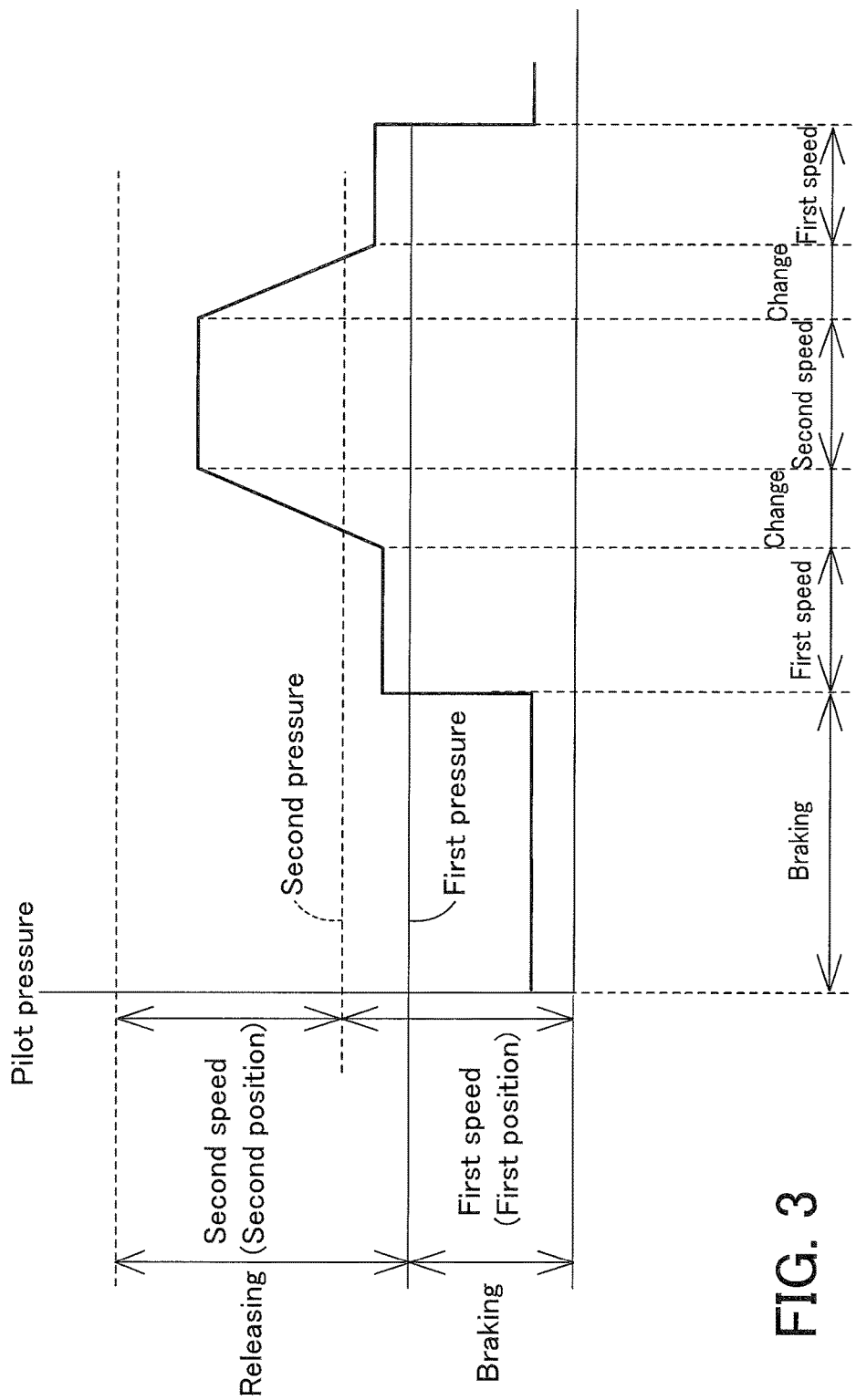
FIG. 3 is a view showing a relationship between: a state of operation of a first hydraulic pressure switch valve (a first position and a second position); a state of operation of a brake mechanism (an operation of braking and an operation of releasing the braking); and a pilot pressure.

FIG. 3 is a view showing a relationship between: a state of operation (the operation state) of the first hydraulic pressure switch valve 63; a state of operation (the operation state) of the brake mechanism 59; and a pressure of the pilot pressure.

For example, as shown in FIG. 3, the pilot pressure applied to the first hydraulic pressure switch valve 63 is approximately zero (0) when the proportional valve 45 is closed (fully closed). Accordingly, the first hydraulic pressure switch valve 63 is set to the first position 63a, and thus the travel motor 57 is set to the first speed. In addition, the pilot pressure applied to the brake mechanism 59 is approximately zero (0) when the proportional valve 45 is fully closed. Accordingly, the spring of the brake mechanism 59 moves the second disk toward the side where the second disk is in contacted with the first disk, and thus the travel motor 57 is braked (in a braking state). Here, when the aperture of the proportional valve 45 is enlarged to set the pilot pressure to a first pressure or more (a pressure for releasing the braking or more), the pilot pressure being applied to the storage portion of the brake mechanism 59, the second disk moves against a pushing force of the spring of the brake mechanism 59, thereby releasing the braking of the travel motor 57. In particular, the proportional valve 45 sets the brake mechanism 59 to be in the pressure for releasing the braking of the travel motor 57, holding the first hydraulic pressure switch valve 63 in the first position 63a. That is, in the hydraulic circuit, the brake mechanism 59 releases the braking of the travel motor 57 under the state where the first hydraulic pressure switch valve 63 is held in the first position 63a.

In addition, when the aperture of the proportional valve 45 is further enlarged to set the pilot pressure to a second pressure or more (a pressure for switching to the second speed or more), the first hydraulic pressure switch valve 63 is switched to be in the second position 63b, and thereby the travel motor 57 is set to be in the second speed. In other words, when the pilot pressure applied to the first hydraulic pressure switch valve 63 is set to the pressure for switching or more, the first hydraulic pressure switch valve 63 is switched to be in the second position 63b.

Meanwhile, as shown in FIG. 1, a control device 70 is configured of an CPU and the like, and controls the aperture of the proportional valve 45. An operation member 71 is connected to the control device 70. The operation member 71 is a switch for the operation of switching the speeds, that is, a switch for setting the first speed or the second speed. The operation member 71 is configured of a seesaw switch capable of freely swinging, a slide switch capable of freely sliding, or a push switch capable of freely being pushed, for example. The seesaw switch allows the setting to the first speed by swinging toward one side and allows the setting to the second speed by swinging toward the other side. The slide switch allows the setting to the first speed by sliding toward one side and allows the setting to the second speed by sliding toward the other side. The push switch sequentially allows the setting to the first speed and the setting to the second speed in response to every pushing.

The control device 70 outputs a control signal to a solenoid of the proportional valve 45 when the first speed is set by the operation member 71 under a state where the engine 29 is in operation. The aperture of the proportional valve 45 is adjusted by the control signal, and thereby the pilot pressures applied to the first hydraulic pressure switch valve 63 and to the brake mechanism 59 are set to be smaller than the second speed switching pressure and to be the braking releasing pressure or more. In addition, the control device 70 outputs a control signal to a solenoid of the proportional valve 45 when the second speed is set by the operation member 71 under a state where the engine 29 is in operation. The aperture of the proportional valve 45 is adjusted by the control signal, and thereby the pilot pressures applied to the first hydraulic pressure switch valve 63 and to the brake mechanism 59 are set to be the second speed switching pressure or more.

As described above, in the first embodiment, the proportional valve 45 is connected to the first hydraulic pressure switch valve 63 and to the brake mechanism 59. In addition to that, regarding the pilot pressure, a pressure (a first pressure) at which the brake mechanism 59 is switched from a braking state to a braking releasing state is set to be lower than a pressure (a second pressure) at which the first hydraulic pressure switch valve 63 is switched from the first position 63_a_ to the second position 63_b_, and thereby the travel motor 57 is set to the first speed under the state where the braking is released.

Next, the hydraulic system for an operation system will be explained.

As shown in FIG. 2, a fourth supply tube (fourth supply path) 100_f_ is disposed on the first hydraulic pump P1. A plurality of control valves 80 are connected to the fourth supply tube 100_f_. The plurality of control valves 80 consist of a boom control valve 80A, a bucket control valve 80B, and an auxiliary control valve 80C, and are referred to as a hydraulic control unit. The boom control valve 80A is a valve configured to control the lift cylinder 26, the bucket control valve 80B is a valve configured to control the tilt cylinder 28, and the auxiliary control valve 80C is a valve configured to control a hydraulic actuator of an auxiliary attachment. Meanwhile, in the hydraulic system for an operation system, the lift cylinder 26, the tilt cylinder 28, the hydraulic actuator of an auxiliary attachment, and the like are referred to as a hydraulic device.

The boom 22 and the bucket 23 can be operated by an operation member 81 disposed around the operator seat 13. The operation member 81 is supported allowing being tilted from a neutral position to a forward direction, to a backward direction, to a width direction perpendicular to the forward direction and to the backward direction, and to a diagonal direction. The tilting operation of the operation member 81 allows the remote control valves 82 disposed on a lower portion of the operation member 81.

A remote control valve 82A for lowering (a lowering remote control valve 82A) is operated to output the pilot pressure from the lowering remote control valve 82A when the operation member 81 is tilted to the forward direction. The pilot pressure is applied to a pressure receiver of the boom control valve 80A, the boom control valve 80A supplies the operation fluid flown into the boom control valve 80A to a rod side of the lift cylinder 26, and thereby the boom 22 is lowered.

A remote control valve 82B for lifting (a lifting remote control valve 82B) is operated to output the pilot pressure from the lifting remote control valve 82B when the operation member 81 is tilted to the backward direction. The pilot pressure is applied to a pressure receiver of the boom control valve 80A, the boom control valve 80A supplies the operation fluid flown into the boom control valve 80A to a bottom side of the lift cylinder 26, and thereby the boom 22 is lifted.

In particular, the boom control valve 80A is configured to control a flow rate of the operation fluid flowing in the lift cylinder 26 on the basis of (depending on) a pressure of the operation fluid (the pilot pressure set by the lowering remote control valve 82A and the pilot pressure set by the lifting remote control valve 82B) set by the operation of the operation member 81.

A remote control valve 82C for bucket dumping is operated when the operation member 81 is tilted to the rightward direction. The pilot pressure is applied to a pressure receiver of the bucket control valve 80B. In this manner, the bucket control valve 80B is operated toward a direction to stretch the tilt cylinder 28, and the bucket 23 is in a dumping movement at a speed proportional to an amount of the tilting of the operation member 81.

A remote control valve 82D for bucket shoveling is operated when the operation member 81 is tilted to the leftward direction. The pilot pressure is applied to a pressure receiver of the bucket control valve 80B. In this manner, the bucket control valve 80B is operated toward a direction to shorten the tilt cylinder 28, and the bucket 23 is in a shoveling movement at a speed proportional to an amount of the tilting of the operation member 81.

That is, the bucket control valve 80B is configured to control a flow rate of the operation fluid flowing in the tilt cylinder 28 on the basis of (depending on) a pressure of the operation fluid (the pilot pressure set by the remote control valve 82C and the pilot pressure set by the remote control valve 82D) set by the operation of the operation member 81. That is, the remote control valves 82A, 82B, 82C, and 82D change a pressure of the operation fluid on the basis of (depending on) the operation of the operation member 81, and supply the operation fluid of the changed pressure to the control valves, such as the boom control valve 80A, the bucket control valve 80B, and the auxiliary control valve 80C.

The auxiliary attachment can be operated by a switch 83 disposed around the operator seat 13. The switch 83 is configured of a seesaw switch capable of freely swinging, a slide switch capable of freely sliding, or a push switch capable of freely being pushed, for example. An operation of the switch 83 is inputted to the control device 70. A command corresponding to an amount of operation of the switch 83 is outputted to a first electromagnetic valve 85A and to a second electromagnetic valve 85B, each of the first electromagnetic valve 85A and the second electromagnetic valve 85B being configured of an electromagnetic valve or the like. The first electromagnetic valve 85A and the second electromagnetic valve 85B are opened depending on the amount of operation of the switch 83. In this manner, the pilot fluid is supplied to the auxiliary control valve 80C connected to the first electromagnetic valve 85A and to the second electromagnetic valve 85B, and the auxiliary actuator of the auxiliary attachment is operated by the operation fluid supplied from the auxiliary control valve 80C.

According to the embodiment of the present invention, in the hydraulic system and the working machine, a proportional valve is connected to the plurality of hydraulic pressure controllers configured to control a hydraulic device, and thus the proportional valve is capable of setting a pressure of a hydraulic fluid being supplied to the hydraulic pressure controllers. The proportional valve is allowed to control the plurality of hydraulic pressure controllers. Accordingly, the number of valves for activating the hydraulic pressure controller can be reduced, and thus the number of parts is reduced.

Second Embodiment

Figure 4:
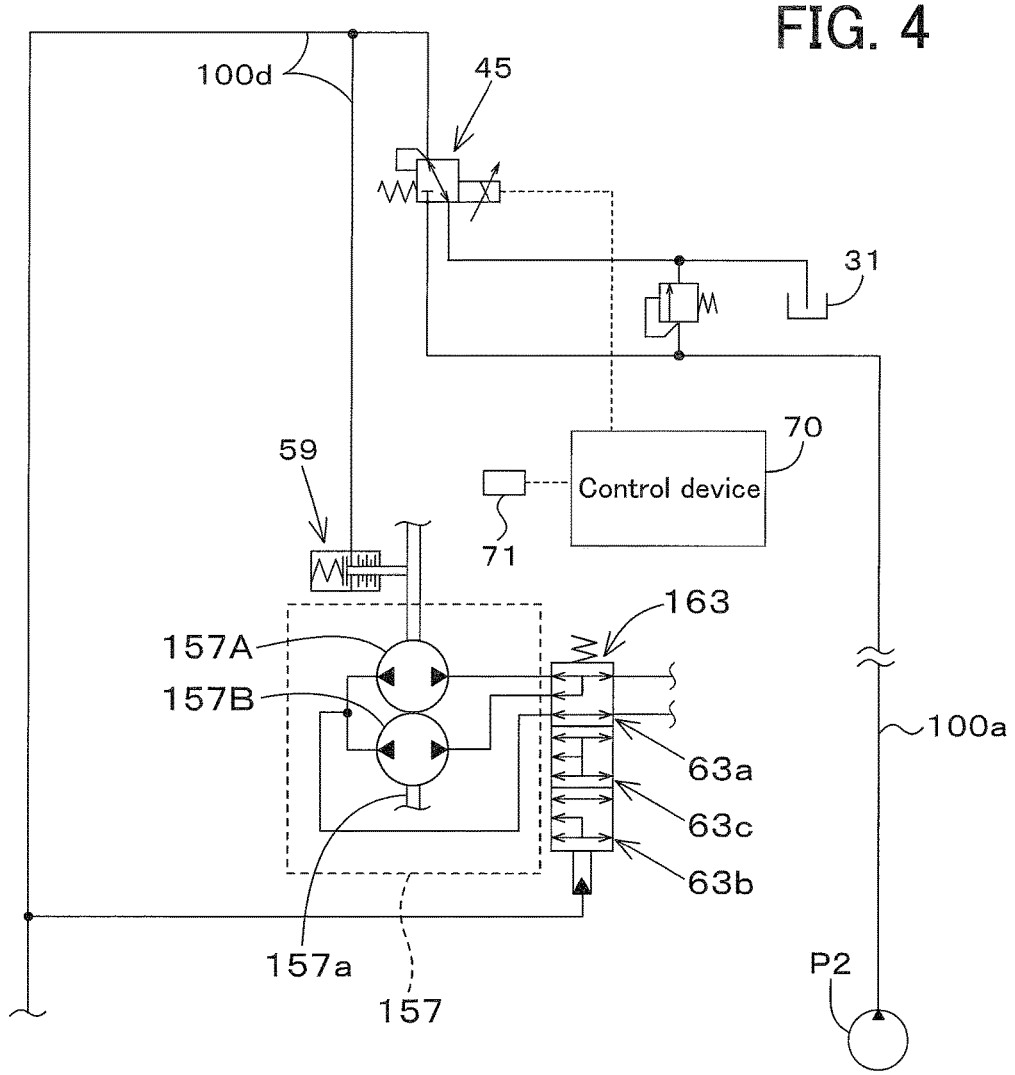
FIG. 4 is a view showing a modified example of a travel motor according to a second embodiment of the present invention.

FIG. 4 and FIG. 5 show a hydraulic system according to a second embodiment of the present invention. The second embodiment describes a modified example employing another travel motor and another first hydraulic pressure switch valve. The travel motor and the second hydraulic pressure switch valve according to the second embodiment can be applied to all embodiments of the present invention. In the following description, explanations of the configuration similar to that of the first embodiment will be omitted.

As shown in FIG. 4, a cam motor (a radial piston motor) is employed as a travel motor 157 in the second embodiment. The travel motor 157 variably changes a displacement thereof (a motor displacement) in operation, thereby changing a revolution speed of and a torque of an output shaft of the travel motor 157. To be detailed, the travel motor 157 includes a first motor 157A and a second motor 157B. Supply of the operation fluid to both of the first motor 157A and the second motor 157B increases the motor displacement, and thereby the travel motor 157 is set to the first speed. In addition, supply of the operation fluid to either one of the first motor 157A and the second motor 157B decreases the motor displacement, and thereby the travel motor 157 is set to the second speed. Meanwhile, the brake mechanism 59 is disposed on the output shaft 157a of the travel motor 157. The brake mechanism 59 has a configuration similar to the configuration described in the first embodiment.

The first hydraulic pressure switch valve 163 is a valve for switching a speed of the travel motor 157 to the first speed or the second speed, the first hydraulic pressure switch valve 163 being configured to be switched to the first position 63a, the second position 63b, or the third position 63c. In particular, the first hydraulic pressure switch valve 163 is switched to the first position 63a when a pressure of the pilot fluid applied to the first hydraulic pressure switch valve 163 is smaller than a predetermined value. The operation fluid is supplied to both of the first motor 157A and the second motor 157B when the first hydraulic pressure switch valve 163 is in the first position 63a, and thereby the travel motor 157 is set to the first speed. The first hydraulic pressure switch valve 163 is switched to the second position 63b through the neutral position 63c when the pressure of the pilot fluid applied to the first hydraulic pressure switch valve 163 is the predetermined value or more (the switching pressure or more). The operation fluid is supplied to the first motor 157A when the first hydraulic pressure switch valve 163 is in the second position 63b, and thereby the travel motor 157 is set to the second speed.

The proportional valve 45 is connected to the first hydraulic pressure switch valve 163 and to the brake mechanism 59.

Figure 5A:
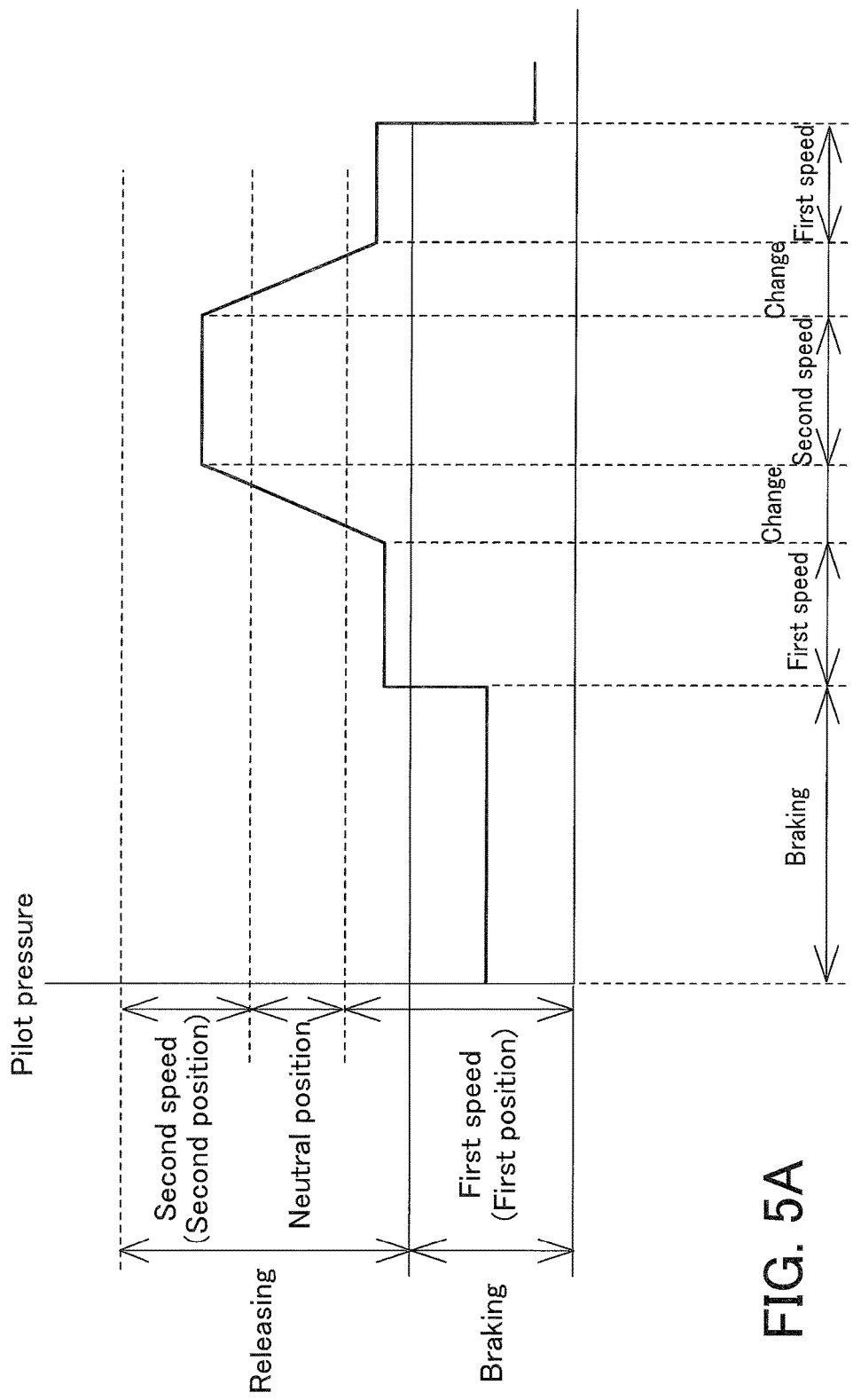
FIG. 5A is a view showing a relationship between: a state of operation of a first hydraulic pressure switch valve (a first position, a second position, a neutral position); a state of operation of a brake mechanism (an operation of braking and an operation of releasing the braking); and a pilot pressure.

FIG. 5A is a view showing a relationship between: a state of operation of the first hydraulic pressure switch valve 163; a state of operation of the brake mechanism 59; and a pressure of the pilot fluid, according to the second embodiment.

For example, as shown in FIG. 5A, the pilot pressure applied to the first hydraulic pressure switch valve 163 is approximately zero (0) when the proportional valve 45 is closed (fully closed), and thereby the first hydraulic pressure switch valve 163 is set to the first position 63a. In addition, the pilot pressure applied to the storage portion of the brake mechanism 59 is approximately zero (0) when the proportional valve 45 is fully closed, and thereby the travel motor 57 is braked. Then, the braking of the travel motor 57 can be released when the aperture of the proportional valve 45 is enlarged to increase the pilot pressure applied to the storage portion of the brake mechanism 59 to the braking releasing pressure or more. At this time, the first hydraulic pressure switch valve 63 is held in the first position 63a. That is, also in the second embodiment, the braking of the travel motor 57 braked by the brake mechanism 59 can be released, holding the first hydraulic pressure switch valve 63 in the first position 63a.

In addition, the first hydraulic pressure switch valve 63 is switched to the second position 63b when the aperture of the proportional valve 45 is further enlarged to increase the pilot pressure to the second pressure or more at which the first hydraulic pressure switch valve 63 is switched from the neutral position 63c to the second position 63b, the pilot pressure being applied to the first hydraulic pressure switch valve 63, and thereby the travel motor 57 is set to the second speed.

Figure 5B:
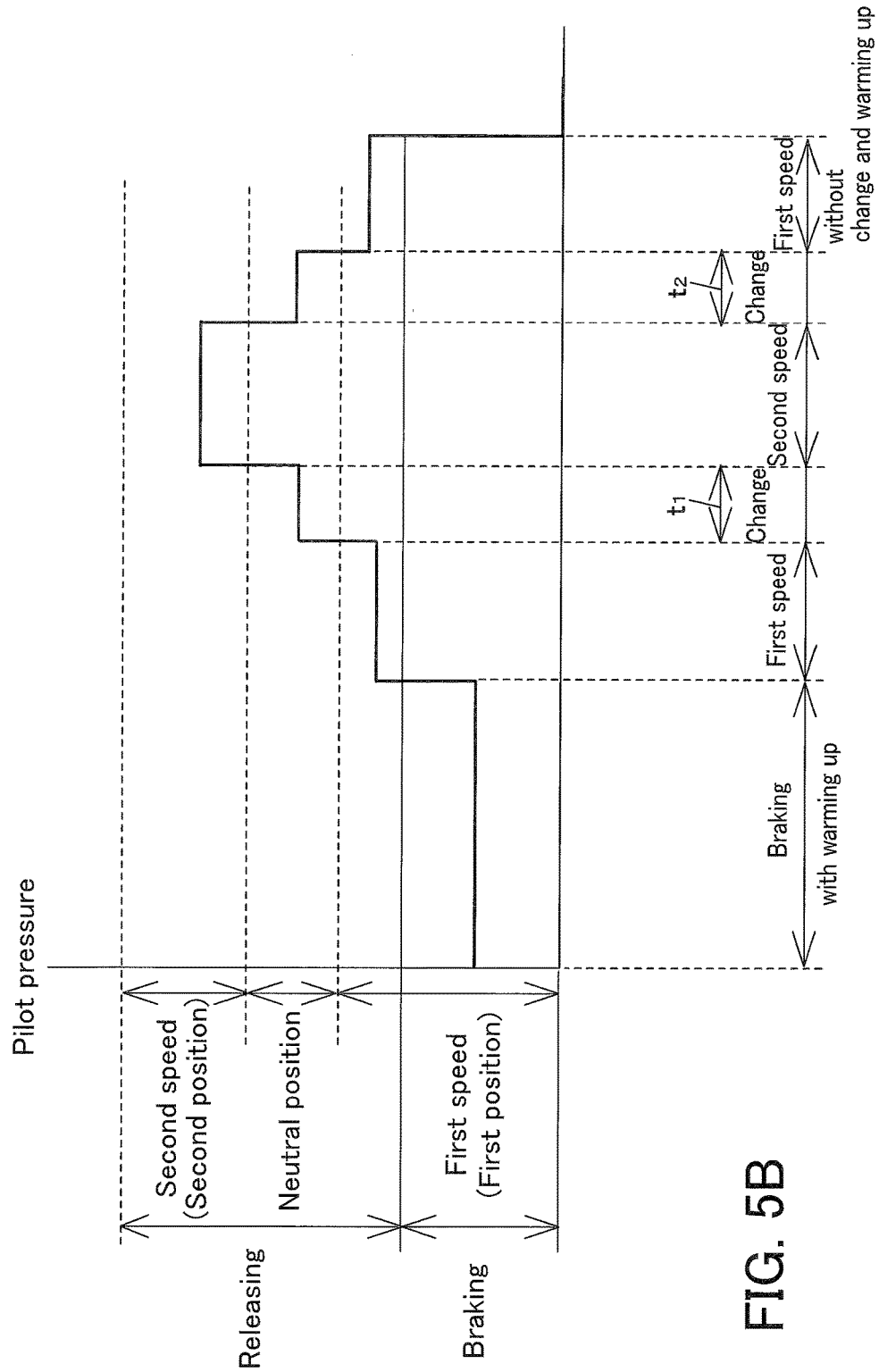
FIG. 5B different from FIG. 5A is a view showing the relationship between: the state of operation of the first hydraulic pressure switch valve (the first position, the second position, the neutral position); the state of operation of the brake mechanism (the operation of braking and the operation of releasing the braking); and the pilot pressure.

Meanwhile, as shown in FIG. 5B, the proportional valve 45 can allow the hydraulic fluid to flow a bit under a braked state at the first speed when the pilot pressure is smaller than the braking releasing pressure in the proportional valve 45 and a pressure of the pilot fluid applied to the first hydraulic pressure switch valve 163 is smaller than a predetermined value, and thereby the proportional valve 45 is warmed up.

Third Embodiment

Figure 6:
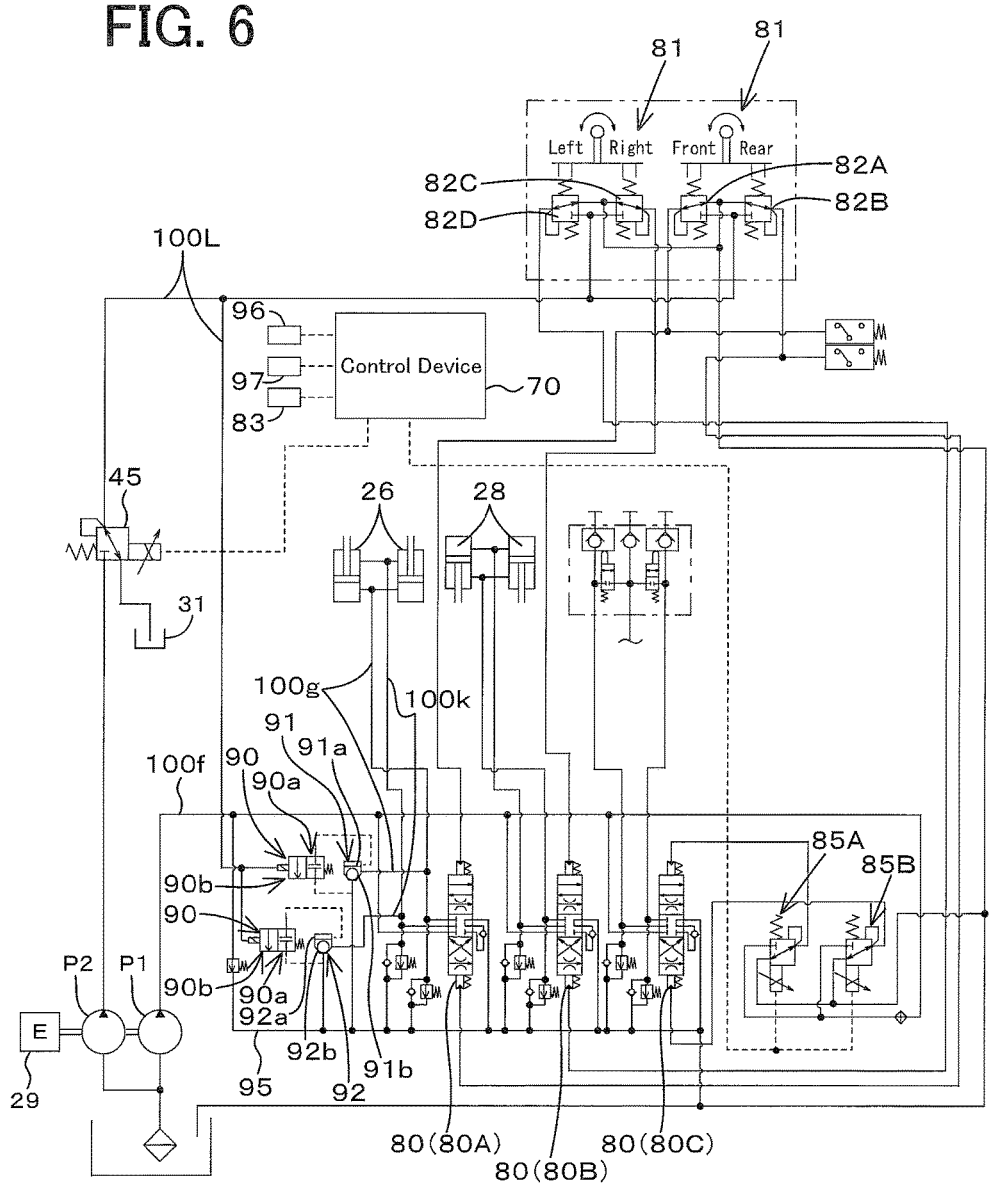
FIG. 6 is a view showing a hydraulic system for an operation system according to a third embodiment of the present invention.
Figure 7:
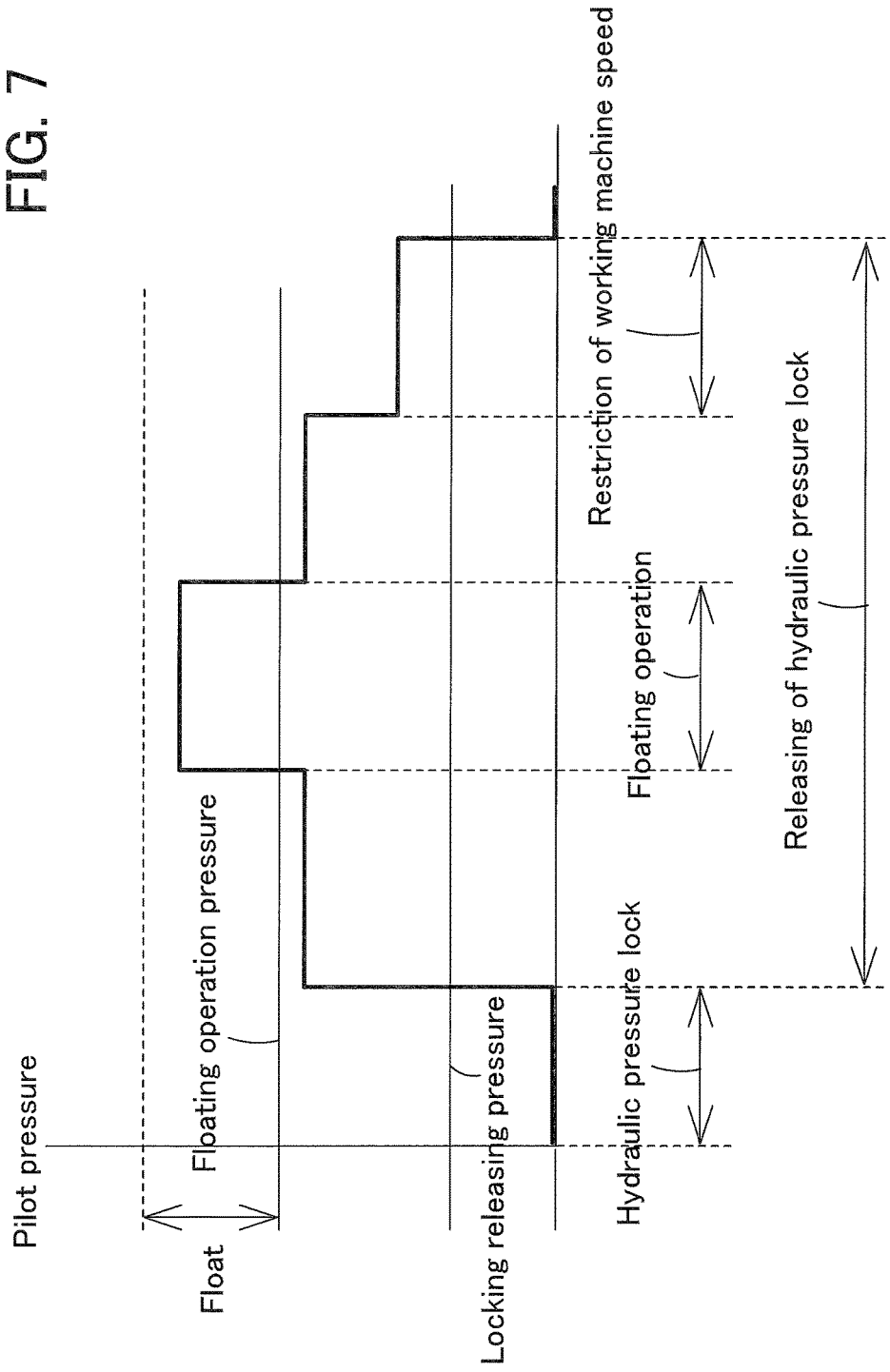
FIG. 7 is a view showing a relationship between: a state of operation of a second hydraulic pressure switch valve (a float operation); a state of operation of a remote control valve (an operation of locking a hydraulic pressure and an operation of releasing the locking of the hydraulic pressure); and a pilot pressure.

FIG. 6 and FIG. 7 show a hydraulic system according to a third embodiment of the present invention. The third embodiment describes a modified example employing another hydraulic system (a hydraulic circuit) for operation. The hydraulic system for operation according to the third embodiment can be applied to the above mentioned hydraulic systems for operation according to the first embodiment and to the second embodiment. In the following description, explanations of the configuration similar to that of the first embodiment and that of the second embodiment will be omitted.

As shown in FIG. 6, a first open-close valve 91 is connected to a fifth supply tube (fifth supply path) 100g, the fifth supply tube 100g being configured to connect the boom control valve 80A to a bottom side of the lift cylinder 26. The first open-close valve 91 is connected to a discharge fluid tube (a drain) 95 serving as a discharge fluid path. A piston is internally built in the first open-close valve 91. The first open-close valve 91 is a valve, the valve being configured to supply the operation fluid of the fifth supply tube 100g to the drain 95 when a first chamber 91a and a second chamber 91b are communicated with each other, the first chamber 91a and the second chamber 91b being separated by the piston. In addition, the first open-close valve 91 is a valve, the valve being configured to stop the operation fluid flowing from the fifth supply tube 100g when the communication between the first chamber 91a and the second chamber 91b is blocked.

In addition, a second open-close valve 92 is connected to a sixth supply tube (sixth supply path) 100k, the sixth supply tube 100k being configured to connect the boom control valve 80A to a rod side of the lift cylinder 26. The second open-close valve 92 is connected to the discharge fluid tube (the drain) 95. A piston is internally built in the second open-close valve 92. The second open-close valve 92 is a valve, the valve being configured to supply the operation fluid of the sixth supply tube 100k to the drain 95 when a first chamber 92a and a second chamber 92b are communicated with each other, the first chamber 92a and the second chamber 92b being separated by the piston. In addition, the second open-close valve 92 is a valve, the valve being configured to stop the operation fluid flowing from the sixth supply tube 100k when the communication between the first chamber 92a and the second chamber 92b is blocked.

Then, in the embodiments described above, the lift cylinder 26 is controlled by the boom control valve 80A that is one of the hydraulic pressure controllers, the lift cylinder 26 being a hydraulic device configured to be operated by the operation fluid. However, in the third embodiment, the lift cylinder 26 is controlled by the other one of the hydraulic pressure controllers. That is, in the third embodiment, two hydraulic pressure controllers configured to control the lift cylinder 26 are disposed. One of the hydraulic pressure controllers is the boom control valve 80A, and the other one is the second hydraulic pressure switch valve 90.

The second hydraulic pressure switch valve 90 changes a state of operation thereof on the basis of (depending on) the pressure of the pilot fluid (the operation fluid), thereby controlling the lift cylinder 26. In particular, the second hydraulic pressure switch valve 90 is a valve configured to set the lift cylinder 26 in a floating state or in a non-floating state. That is, the second hydraulic pressure switch valve 90 is configured to perform a float control for the lift cylinder 26.

For details, the second hydraulic pressure switch valve 90 is a two-position switch valve, the two-position switch valve being configured to be switched between two positions, a third position 90a and a fourth position 90, on the basis of (depending on) a pressure of the pilot fluid (the pilot pressure). The second hydraulic pressure switch valve 90 is switched to the third position 90a when the pilot pressure applied to the second hydraulic pressure switch valve 90 reaches a predetermined pressure, thereby changing the operation state of the second hydraulic pressure switch valve 90. In addition, the second hydraulic pressure switch valve 90 is switched to the fourth position 90b when the pilot pressure applied to the second hydraulic pressure switch valve 90 is smaller than a predetermined pressure, thereby changing the operation state of the second hydraulic pressure switch valve 90.

The second hydraulic pressure switch valve 90 is connected to the first open-close valve 91 and to the second open-close valve 92. The first chamber 91a and the second chamber 91b of the first open-close valve 91 are communicated with each other when the second hydraulic pressure switch valve 90 connected to the first open-close valve 91 is in the fourth position 90b. In addition, the first chamber 92a and the second chamber 92b of the second open-close valve 92 are communicated with each other when the second hydraulic pressure switch valve 90 connected to the second open-close valve 92 is in the fourth position 90b. Accordingly, the first supply tube 100g and the sixth supply tube 100k are connected to the drain 95 by the first open-close valve 91 and the second open-close valve 92. As the result, the bottom side of and the rod side of the lift cylinder 26 are connected to the drain 95, and accordingly the lift cylinder 26 is set to be in the floating state.

On the other hand, the communication between the first chamber 91a and the second chamber 91b of the first open-close valve 91 is blocked when the second hydraulic pressure switch valve 90 connected to the first open-close valve 91 is in the third position 90a. In addition, the communication between the first chamber 92a and the second chamber 92b of the second open-close valve 92 is blocked when the second hydraulic pressure switch valve 90 connected to the second open-close valve 92 is in the third position 90a. Accordingly, the first supply tube 100g and the sixth supply tube 100k are not connected to the drain 95 by the first open-close valve 91 and the second open-close valve 92. As the result, the operation fluid from the boom control valve 80A is supplied to the bottom side of and the rod side of the lift cylinder 26, and accordingly the lift cylinder 26 is set to be in the non-floating state, thereby moving the lift cylinder 26 on the basis of (depending on) an operation of the operation member 81.

As shown in FIG. 6, the hydraulic circuit includes the proportional valve 45. The proportional valve 45 is connected to the discharge fluid tube 100a, and thereby allowing the pilot fluid (the operation fluid) to pass through the proportional valve 45 and the discharge fluid tube 100a, the pilot fluid being discharged from the second pump P2. In addition, the proportional valve 45 is connected to the hydraulic pressure control part (the second hydraulic pressure switch valve 90) and to the remote control valve 82 for operation (the lowering remote control valve 82A, the lifting remote control valve 82B, the remote control valve 82C, and the remote control valve 82D) through a seventh supply tube 100L. The proportional valve 45 is a valve configured to set a pressure of the pilot fluid (operation fluid) being to be supplied to the first hydraulic pressure switch valve 63 and to the remote control valve 82 for operation, that is, an electromagnetic proportional valve configured to change an aperture of valve by using magnetic excitation.

Changing of an aperture of the proportional valve 45 changes a flow rate of the pilot fluid, the pilot fluid flowing from the discharge fluid tube 100a to the seventh supply tube 100L. In particular, the changing of an aperture of the proportional valve 45 allows to change the pilot pressure applied to the second hydraulic pressure switch valve 90 and to the remote control valve 82.

FIG. 7 is a view showing a relationship between: a state of operation of the second hydraulic pressure switch valve 90; a state of operation of the remote control valve 82; and a pressure of the pilot pressure.

For example, as shown in FIG. 7, the pilot pressure applied to the second hydraulic pressure switch valve 90 and to the remote control valve 82 is approximately zero (0) when the proportional valve 45 is closed (fully closed). In that case, the pilot fluid is not supplied to the remote control valve 82, the control valves (the boom control valves 80A, the bucket control valve 80B, and the auxiliary control valve 80C) cannot be operated even when the operation member 81 is operated, and thus a state where the hydraulic pressure (a hydraulic pressure locking state) is locked is established.

In particular, the proportional valve 45 stops the operation fluid supplied to the second hydraulic pressure switch valve 90 and to the remote control valve 82, thereby establishing the state where the hydraulic pressure is locked. Then, the second hydraulic pressure switch valve 90 is in the third position 40a under the hydraulic pressure locking state.

In addition, when the aperture of the proportional valve 45 is enlarged to set the pilot pressure to a third pressure or more (a pressure for releasing the locking (a locking releasing pressure) or more), the pilot pressure being applied to the remote control valve 82, the enlargement allows the setting of the pilot pressure sufficient to activate the control valves (the boom control valves 80A, the bucket control valve 80B, and the auxiliary control valve 80C) due to the operation of the remote control valve 82. Here, the locking releasing pressure is a pressure allowing the control valves to be sufficiently opened on the basis of an operation of the remote control valve 82 even when the pilot pressure set by the operation of the remote control valve 82 is the minimum, and thereby the hydraulic actuator can be operated at the locking releasing pressure. In other words, the locking pressure is a pressure restricting the control valves not to be sufficiently opened in an operation of the remote control valve 82 even when the pilot pressure set by the operation of the remote control valve 82 is the maximum, and thereby the hydraulic actuator cannot be operated at the locking pressure. Accordingly, the locking pressure is not limited to 0 MPa, and may be a pressure at which the hydraulic actuator cannot be operated even when the locking pressure is larger than 0 MPa.

Moreover, when the aperture of the proportional valve 45 is further enlarged to set the pilot pressure to a fourth pressure or more (a pressure for the floating operation (a floating operation pressure) or more), the pilot pressure being applied to the second hydraulic pressure switch valve 90, the second hydraulic pressure switch valve 90 is switched to the fourth position 90b, and thereby the lift cylinder 26 is set to be in the floating state.

Meanwhile, the aperture of the proportional valve 45 is controlled by the control device 70. Operation members 96 and 97 are connected to the control device 70. Each of the operation members 96 and 97 is configured of a seesaw switch capable of freely swinging, a slide switch capable of freely sliding, a push switch capable of freely being pushed, or a lever, for example.

The control device 70 outputs a control signal to a solenoid of the proportional valve 45 when the operation member 96 is operated to order the locking of the hydraulic pressure. The proportional valve 45 is closed on the basis of (depending on) the control signal, and thereby the hydraulic pressure locking state is established. In addition, the control device 70 outputs a control signal to the solenoid of the proportional valve 45 when the operation member 96 is operated to order the releasing of locking of the hydraulic pressure. The aperture of the proportional valve 45 is adjusted on the basis of (depending on) the control signal, and thereby the pilot pressures applied to the remote control valve 82 is set to the locking releasing pressure or more.

In addition, the control device 70 outputs a control signal to the solenoid of the proportional valve 45 when the operation member 97 is operated to order the floating operation. The aperture of the proportional valve 45 is adjusted on the basis of (depending on) the control signal, and thereby the pilot pressures applied to the second hydraulic pressure switch valve 90 is set to the floating operation pressure or more.

As described above, in the third embodiment, the proportional valve 45 is connected to the second hydraulic pressure switch valve 90 and to the pilot valve 82. And further, regarding the pilot pressure, the lock releasing pressure for the releasing of the hydraulic pressure lock is set to be lower than a pressure (a fourth pressure) at which the second hydraulic pressure switch valve 90 is switched from the third position 90a to the fourth position 90b, and thus the lift cylinder 26 is set to be in the floating state under a state where the hydraulic pressure lock is released.

The first embodiment to the third embodiment described above explain: the speed change by the first hydraulic pressure switch valve 63; the brake control by the brake mechanism 59; and the float control by the second hydraulic pressure switch valve 90. However, a combination of: the speed change; the brake control; the float control; and the hydraulic pressure lock is not limited to that of the embodiment described above.

Figure 8:
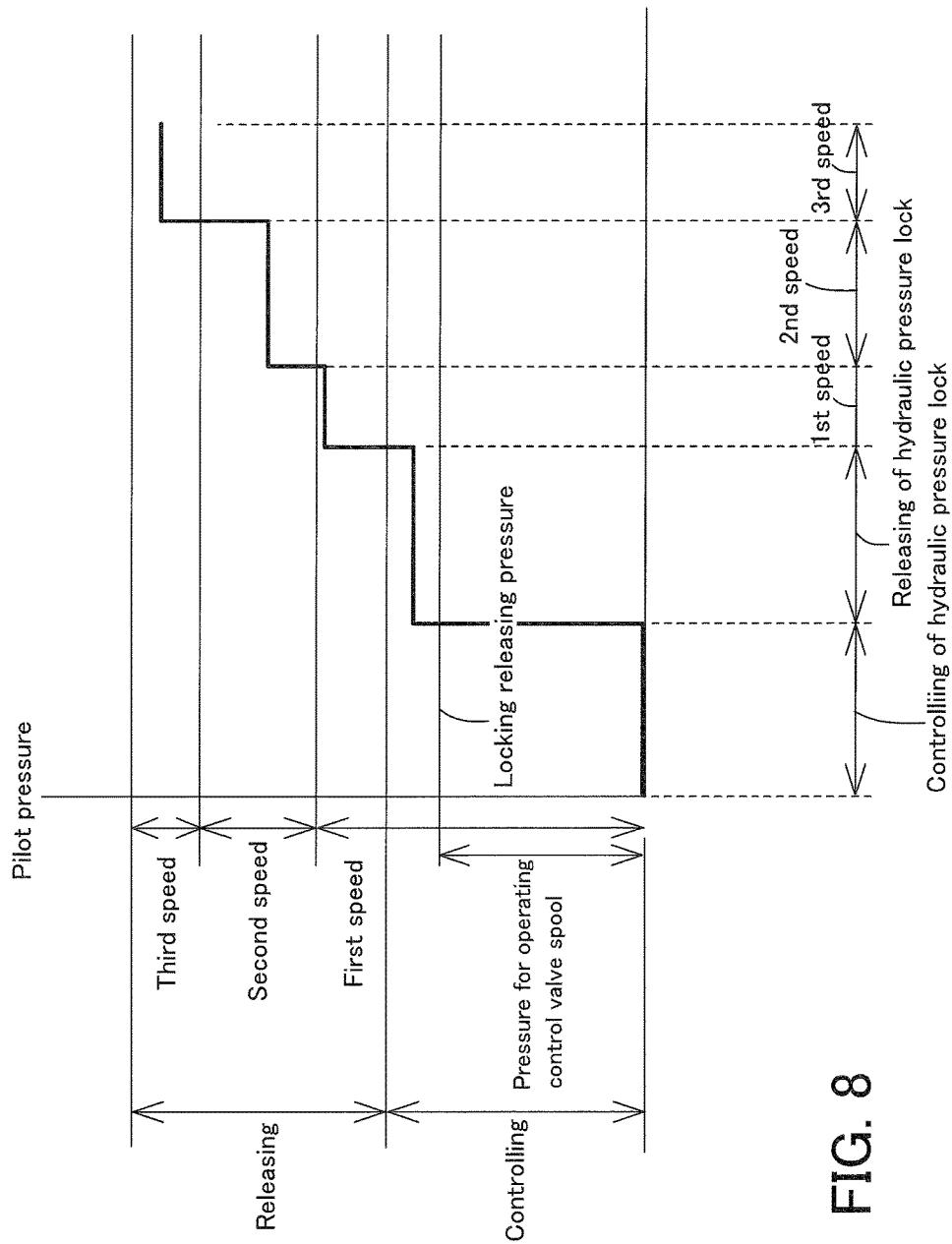
FIG. 8 is a view showing a relationship between: three speeds in changing a speed; a brake mechanism; a hydraulic pressure lock; and a pilot pressure.

In addition, regarding the speed change of the travel motor 57, the first speed and the second speed have been explained. However, the speed change is not limited to that of the embodiment described above, and may employ multi-speeds, three speeds or more. FIG. 8 is a view showing a pilot pressure controlled by the proportional valve 45, the pilot pressure changing depending on the speed of the travel motor 57 changing from the first speed to the third speed. Meanwhile, the illustration of FIG. 8 supposes that the remote control valve 82 and the brake mechanism 59 are disposed on a downstream side of the proportional valve 45 and that the first hydraulic pressure switch valve 63 is configured to switch the positions of the first hydraulic pressure switch valve 63 to the first position, to the second position, and to the third position.

As shown in FIG. 8, the travel motor 57 is braked under the hydraulic pressure locking state when the proportional valve 45 is closed. Then, the aperture of the proportional valve 45 is gradually opened to set the pilot pressure to the locking releasing pressure or more, the pilot pressure being applied to the remote control valve 82, and thereby the hydraulic pressure lock is released. The travel motor 57 is set to the first speed when the pilot pressure is smaller than a pressure for the changing from the first speed to the second speed, the pilot pressure being applied to the first hydraulic pressure switch valve 63. And, the travel motor 57 can be set to the second speed when the pilot pressure is smaller than a pressure for the changing from the second speed to the third speed, the pilot pressure being applied to the first hydraulic pressure switch valve 63. In addition, the travel motor 57 can be set to the third speed when the pilot pressure is equal to or more than a pressure for the changing to the third speed, the pilot pressure being applied to the first hydraulic pressure switch valve 63.

Figure 9A:
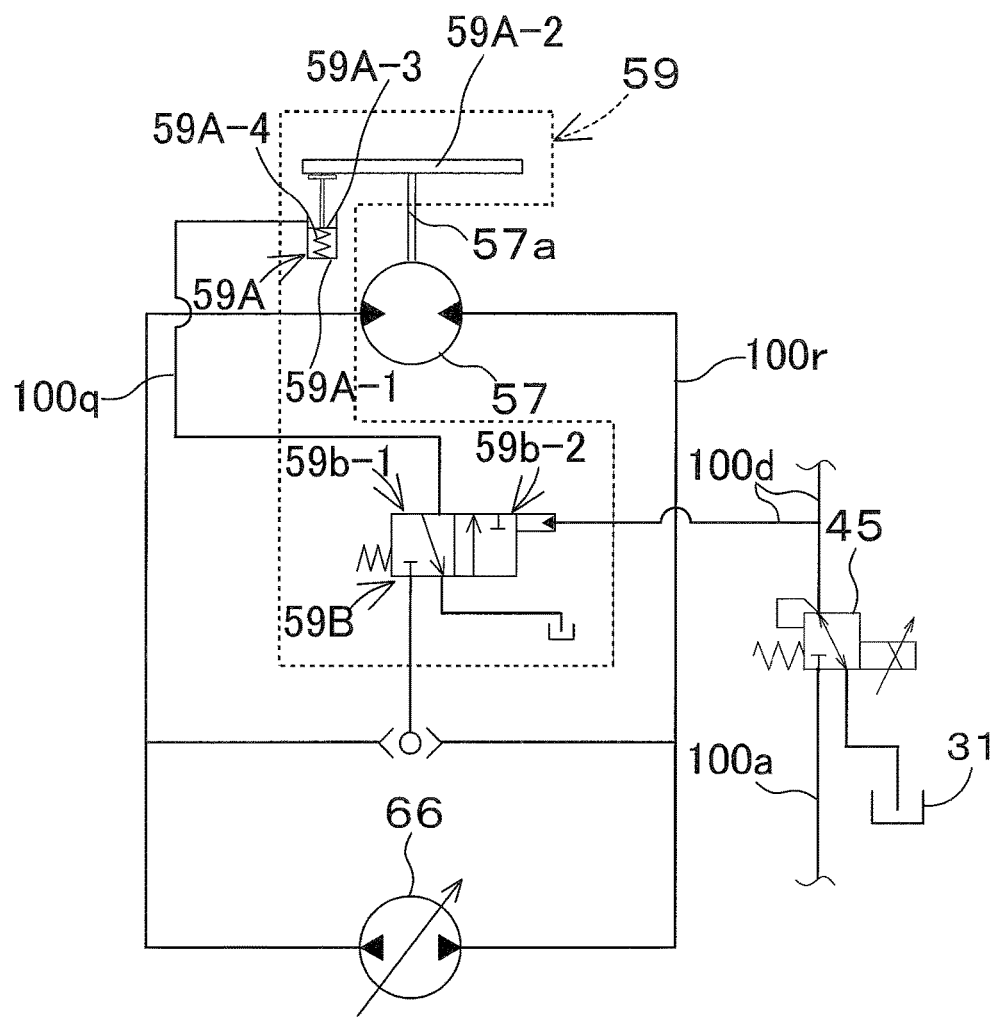
FIG. 9A is a view sowing a hydraulic circuit including a brake mechanism.
Figure 9B:
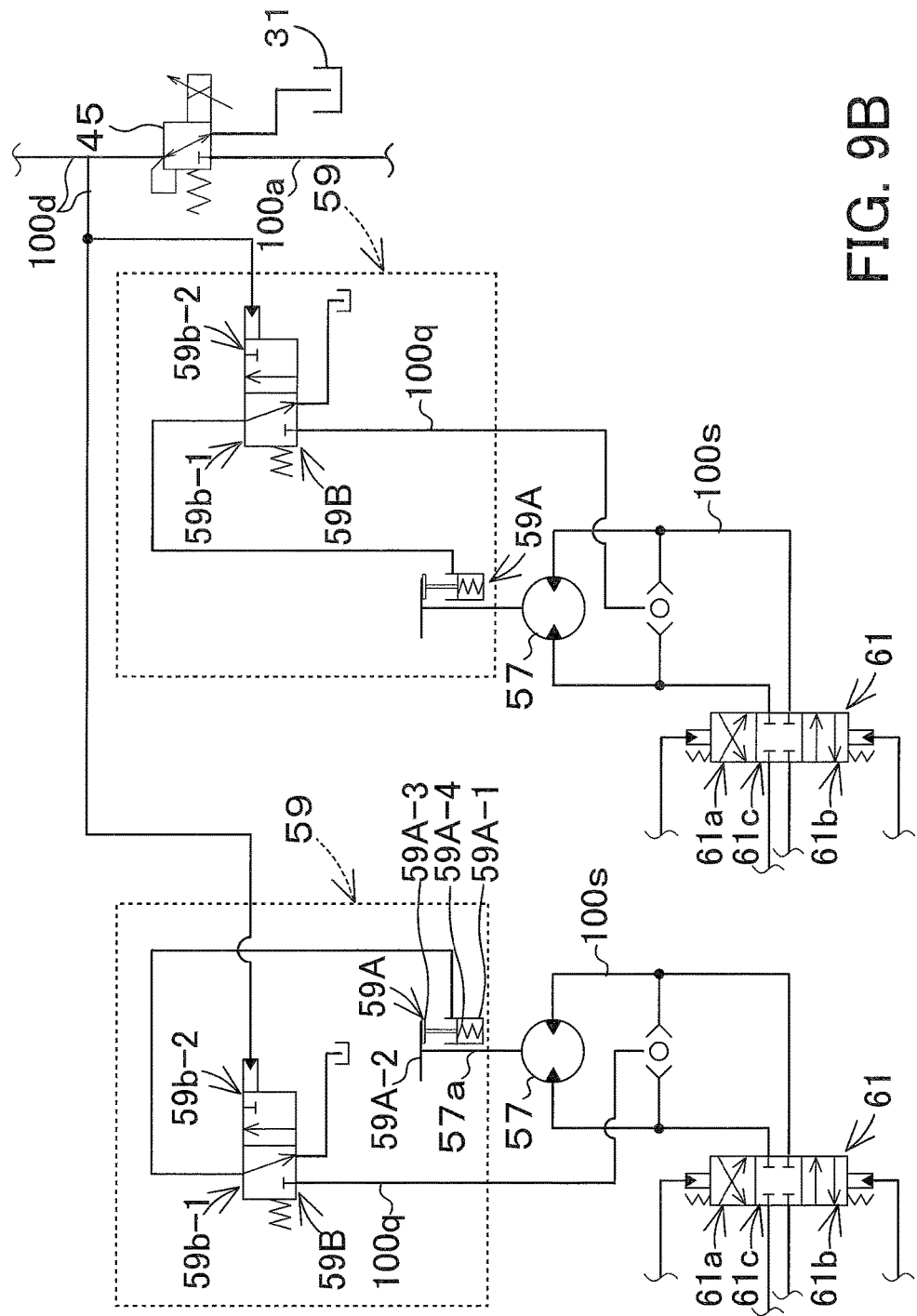
FIG. 9B is a view sowing a hydraulic circuit including a brake mechanism.

The brake mechanism 59 is not limited to that of the embodiment described above, and may be a mechanism shown in hydraulic circuits shown in FIG. 9A and FIG. 9B. FIG. 9A is a view showing a part of a hydraulic circuit for travel.

FIG. 9A is a view showing a part of a hydraulic circuit for travel, and shows the brake mechanism 59, the hydraulic pump 66 for travel, and the travel motor 57 configured to be driven by the hydraulic pump 66. The hydraulic pump 66 for travel and the travel motor 57 each have the configurations similar to the configurations of the embodiment described above, and accordingly the explanations of the hydraulic pump 66 for travel and the travel motor 57 are omitted.

The brake mechanism 59 includes an operation device 59A and a third hydraulic pressure switch valve 59B configured to operate the operation device 59A. The hydraulic controllers are configured of the operation device 59A and the third hydraulic pressure switch valve 59B. The operation device 59A and the third hydraulic pressure switch valve 59B are connected to each other by an eighth supply tube (eighth supply path) 100q. The travel motor 57, the third hydraulic pressure switch valve 59B, and the hydraulic pressure pump 66 are connected to each other by a ninth supply tube (ninth supply path) 100r configured to be circular.

The operation device 59A includes a housing portion 59A-1, a first disk 59A-2, a second disk 59A-3, and a spring 59A-4. The housing portion 59A-1 houses the second disk 59A-3 and the spring 59A-4. The first disk 59A-2 is a disk disposed on the output shaft 57a of the travel motor 57. The second disk 59A-3 is a disk configured to be movable. The spring 59A-4 pushes the second disk 59A-3 toward a side where the second disk 59A-3 is in contacted with the first disk 59A-2.

The third hydraulic pressure switch valve 59B is a valve connected to the operation device 59A, and is configured to be switched between a first position 59b-1 and a second position 59b-2. The operation fluid in the housing portion 59A-1 flows to the operation fluid tank 31 through the eighth supply tube 100q when the third hydraulic pressure switch valve 59B is in the first position 59b-1, thus the operation fluid in the housing portion 59A-1 is released, and thereby the braking can be made by the brake mechanism 59. The eighth supply tube 100q and the ninth supply tube 100r are communicated to each other when the third hydraulic pressure switch valve 59B is in the second position 59b-2, the operation fluid flowing in the ninth supply tube 100r flows into the housing portion 59A-1 through a shuttle valve, and thereby the braking by the brake mechanism 59 can be released.

Meanwhile, as shown in FIG. 9A, the proportional valve 45 is connected to the third hydraulic pressure switch valve 59B. The proportional valve 45 is connected to the discharge fluid tube 100a and to the third supply tube 100d. The third hydraulic pressure switch valve 59B of the brake mechanism 59 is connected to the third supply tube 100d. Additionally, a hydraulic pressure controller is connected to the third supply tube 100d in addition to the third hydraulic pressure switch valve 59B, the hydraulic pressure controller being configured to perform any one of the speed change, the float control, and the hydraulic pressure lock. In the case where the braking is released, the proportional valve 45 is opened up to an aperture allowing the pilot pressure to be the first pressure or more (the braking releasing pressure or more), the pilot pressured being applied to the third hydraulic pressure switch valve 59B, and thus the third hydraulic pressure switch valve 59B is switched to the second position 59b-2. Moreover, in the case the braking is made, the proportional valve 45 is closed until the pilot pressure applied to the third hydraulic pressure switch valve 59B becomes smaller than the braking releasing pressure, and thus the third hydraulic pressure switch valve 59B is switched to the first position 59b-1. In this manner, even in the brake mechanism including the operation device 59A and the third hydraulic pressure switch valve 59B, the proportional valve 45 can made the braking and the releasing of the braking.

FIG. 9B is a view showing a part of the hydraulic circuit for travel, and shows the brake mechanism 59, the travel motor 57, and a travel control valve 61 configured to control the travel motor 57. The travel motor 57 and the brake mechanism 59 are devices configured to drive: the first travel portion 21L disposed on the left; and the second travel portion 21R disposed on the right, and the respective configurations of the travel motor 7 and the brake mechanism 59 are similar to the configurations described in the embodiments mentioned above, and accordingly the explanations of the travel motor 7 and the brake mechanism 59 are omitted. Meanwhile, the hydraulic pressure circuit for travel shown in FIG. 9B can be applied to the working machine such as a backhoe.

The travel control valve 61 is configured to be switched to the first position 61a, the second position 61b, and the third position 61c. The operation fluid is supplied from the first pump P1 to the ravel control valve 61. The travel motor 57 normally revolves when the travel control valve 61 is in the second position 61b. The travel motor 57 reversely revolves when the travel control valve 61 is in the first position 61a. Meanwhile, the switching between the first position 61a, the second position 61b, and the third position 61c in the travel control valve 61 can be made by an operation member and a pilot valve each not sown in the drawings.

Fourth Embodiment

Figure 10A:
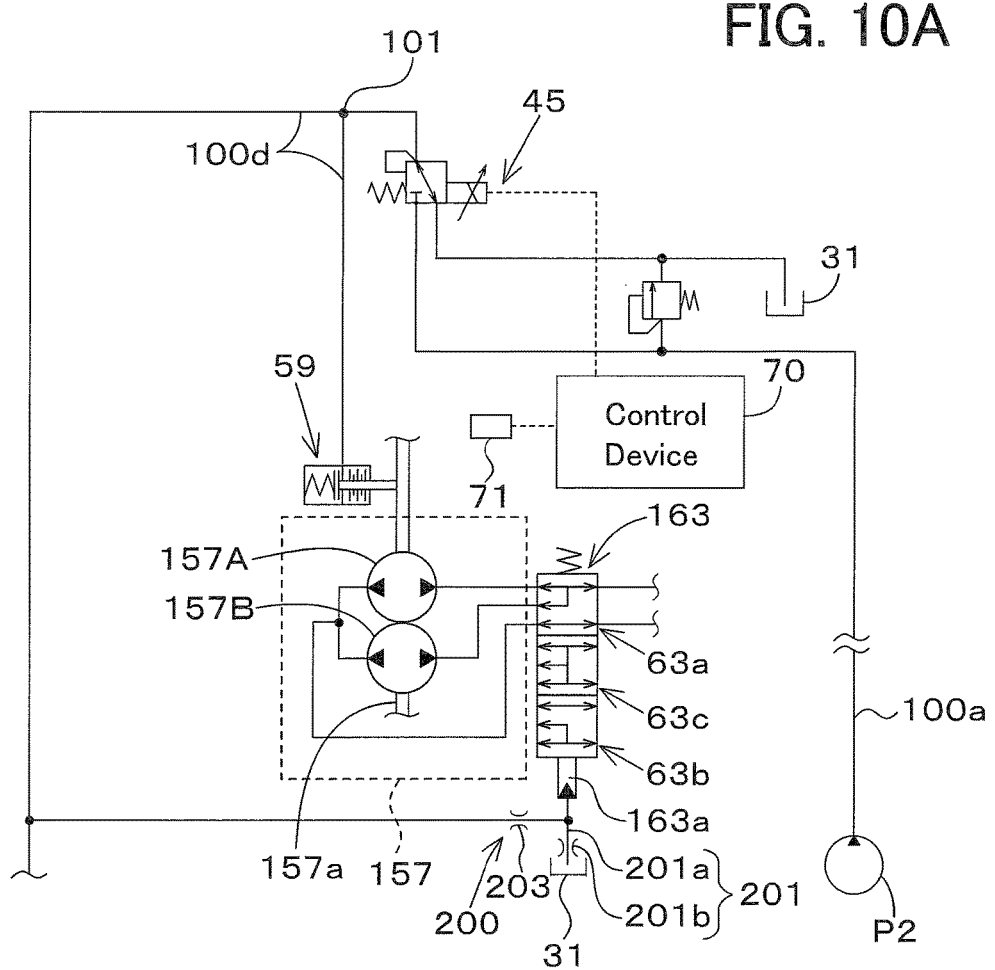
FIG. 10A is a view showing a hydraulic system according to a fourth embodiment of the present invention.

FIG. 10A shows a hydraulic system according to a fourth embodiment of the present invention. The hydraulic system according to the fourth embodiment is a system disposing a differential pressure unit 200 on the hydraulic system described in the embodiments mentioned above. In the following description, explanations of the configuration similar to that of the first embodiment and that of the third embodiment will be omitted.

Of the plurality of hydraulic pressure controllers, the differential pressure unit 200 makes a difference between: a pressure of the operation fluid applied to an arbitrary hydraulic pressure controller (hereinafter referred to as a first hydraulic pressure controller); and a pressure of the operation fluid applied to the hydraulic pressure controller (hereinafter referred to as a second hydraulic pressure controller) other than the arbitrary hydraulic pressure controller. In particular, as shown in FIG. 10A, the first hydraulic pressure controller is the brake mechanism 59. The second hydraulic pressure controller is the first hydraulic pressure switch valve 163 configured to switch a speed of the travel motor 157 to the first speed or the second speed. That is, regarding the operation fluid outputted from the proportional valve 45, the differential pressure unit 200 makes a difference between a pressure applied to the brake mechanism 59 and a pressure applied to the first hydraulic pressure switch valve 163.

For more details, the differential pressure unit 200 includes: a bleed circuit (a bleed off circuit) 201 disposed on the third supply tube 100d connecting the proportional valve 45 and the first hydraulic pressure switch valve (the second hydraulic pressure controller) 163 to each other; and a throttle (restrictor) 203. The bleed circuit 201 includes a discharge fluid tube (a discharge fluid path) 201a and a throttle (a restrictor) 201b, the discharge fluid tube 201a being configured to connect: a pressure receiver 163a of the first hydraulic pressure switch valve 163; and the operation fluid tank 31 to each other, the operation fluid tank 31 being disposed on the discharge fluid tube 201a. The throttle 203 is disposed on the third supply tube 100d between: a branching portion 101 of the third supply tube 100d; and the discharge fluid tube 201a. Meanwhile, a hydraulic hose having a large pressure loss may be employed, instead of the throttle 203, between the branching portion 101 and the discharge fluid tube 201a.

As described above, the proportional valve 45 and the brake mechanism 59 are connected by the third supply tube 100d; however, a throttle or the like for reducing a pressure is not disposed on the path of the third supply tube 100d. Thus, the pressure of the operation fluid applied to the brake mechanism 59 is approximately equal to the pressure of the operation fluid outputted from the proportional valve 45. On the other hand, the bleed circuit 201 and the throttle 203 are disposed on the third supply tube 100d between the proportional valve 45 and the first hydraulic pressure switch valve 163, and thereby the pressure applied to the first hydraulic pressure switch valve 163 is lower than the pressure applied to the brake mechanism 59.

In this manner, the differential pressure unit 200 makes a differential pressure between: the pressure applied to the first hydraulic pressure switch valve 163; and the pressure applied to the brake mechanism 59. Thus, the aperture of the proportional valve 45 can be changed even when a difference between: the braking releasing pressure of the brake mechanism 59; and a switching pressure for the first hydraulic pressure switch valve 163 is small, the switching pressure being a pressure at which the first hydraulic pressure switch valve 163 is switched from the neutral position 63c to the second position 63b, and thereby the braking of the brake mechanism 59 and the switching of the first hydraulic pressure switch valve 163 can be stably switched.

Figure 10B:
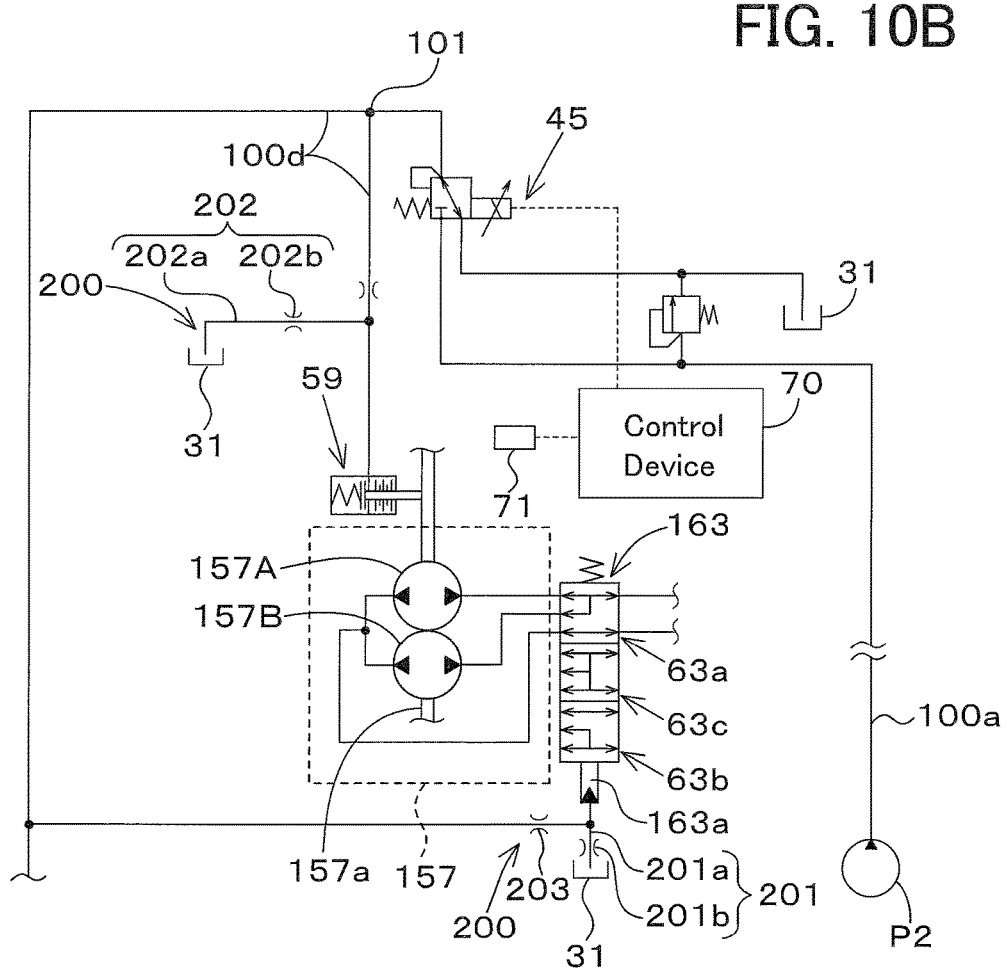
FIG. 10B is a view showing a modified example of the hydraulic system according to the fourth embodiment.

Meanwhile, as shown in FIG. 10B, a bleed circuit 202 may be disposed on a side of the brake mechanism 59. The bleed circuit 202 includes a discharge fluid tube 202a and a throttle 202b. One end of the discharge fluid tube 202a is connected to a section extending from the branching portion 101 of the third supply tube 100d to the brake mechanism 59. The other end of the discharge fluid tube 202a is connected to the operation fluid tank 31. The throttle 202b is disposed on the discharge fluid tube 202a.

Additionally, in the fourth embodiment, the brake mechanism 59 is exemplified as the first hydraulic pressure controller, and the first hydraulic pressure switch valve 163 is exemplified as the second hydraulic pressure controller. However, the first hydraulic pressure controller and the second hydraulic pressure controller are not limited to the examples described in the embodiment.

Fifth Embodiment

Figure 11:
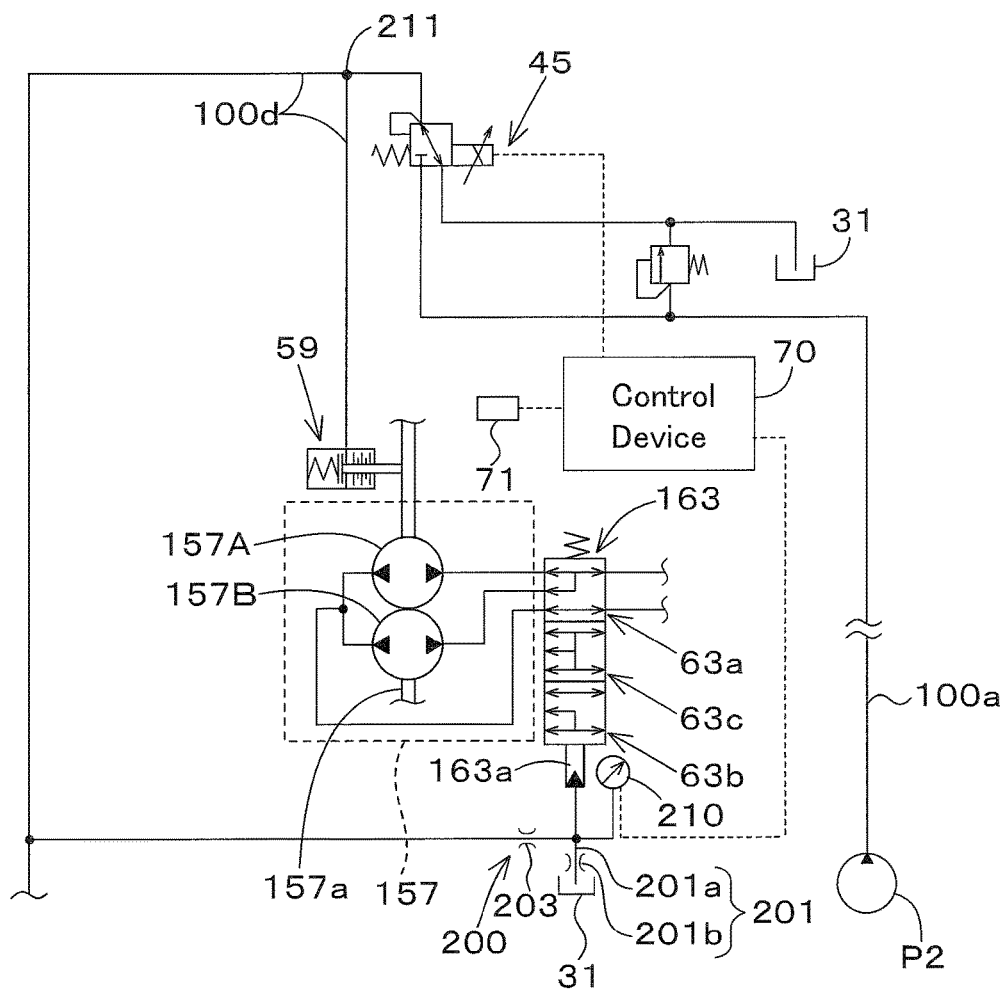
FIG. 11 is a view showing a hydraulic system according to a fifth embodiment of the present invention.

FIG. 11 shows a hydraulic system according to a fifth embodiment of the present invention. The hydraulic system according to the fifth embodiment is a system disposing a measurement device 210 on the hydraulic system described in the fourth embodiment mentioned above. Description shown in the fifth embodiment can be applied to all of the embodiments. In the following description, explanations of the configuration similar to that of the embodiments mentioned above will be omitted.

The measurement device 210 is a device configured to measure a pressure of the operation fluid applied to the pressure receiver 163a of the second hydraulic pressure controller 163 that is one of the first hydraulic pressure controller 59 and the second hydraulic pressure controller 163, the second hydraulic pressure controller 163 being activated later then the first hydraulic pressure controller 59.

The measurement device 210 is connected to a fluid path following the branching portion 101 in the third supply tube 100d. In the embodiment, the measurement device 210 is connected to a portion in the vicinity of the pressure receiver 163a of the second hydraulic pressure controller 163.

A pressure of the operation fluid measured by the measurement device 210 is outputted to the control device 70. The control device 70 outputs a control signal to a solenoid of the proportional valve 45 when the second speed is set by the operation member 71 under a state where the engine 29 is in operation. In particular, the control device 70 refers to a pressure of the operation fluid measured by the measurement device 210 (a pressure applied to the second hydraulic pressure controller 163), and adjusts the aperture of the proportional valve 45 to set a pressure of the operation fluid (the pilot pressure) to the switching pressure for the second speed or more, the pressure being applied to the second hydraulic pressure controller 163. In this manner, the pressure applied to the second hydraulic pressure controller 163 is measured by the measurement device 210 and is fed back to the control device 70, and thus the second hydraulic pressure controller 163 can be stably switched from the first speed to the second speed.

Meanwhile, the fifth embodiment (FIG. 11) exemplifies and explains the hydraulic system including the differential pressure unit 200. However, the configuration described in the fifth embodiment can be applied also to a hydraulic system not including the differential pressure unit 200.

Sixth Embodiment

Figure 12:
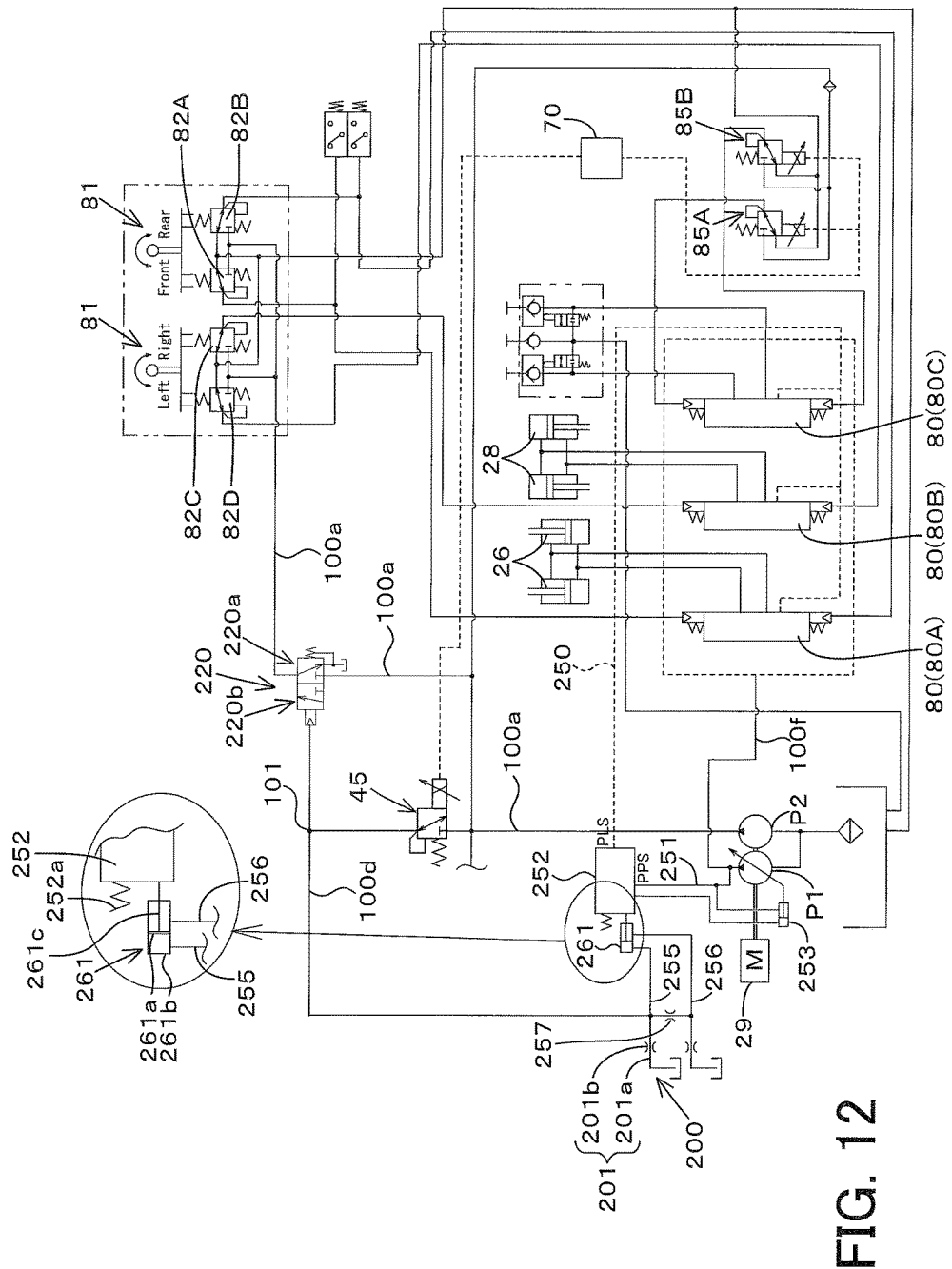
FIG. 12 is a view showing a hydraulic system according to a sixth embodiment of the present invention.

FIG. 12 shows a hydraulic system according to a sixth embodiment of the present invention. The hydraulic system according to the sixth embodiment includes a load sensing system and a power control system. Description shown in the sixth embodiment also can be applied to all of the embodiments. In the following description, explanations of the configuration similar to that of the embodiments mentioned above will be omitted.

As shown in FIG. 12, the hydraulic system includes the load sensing system and the power control system. In addition, the hydraulic system shown in FIG. 12 employs a hydraulic pressure lock valve 220 as the first hydraulic pressure controller, and employs a differential pressure operating portion 261 of the power control system, the differential pressure operating portion 261 being described later as the second hydraulic pressure controller. The hydraulic pressure lock valve 220 and the differential pressure operating portion 261 are connected to the proportional valve 45 by the third supply tube 100d. The hydraulic pressure lock valve (a first hydraulic pressure lock valve) 220 is an electromagnetic valve configured to switch the operation fluid to be supplied to or not to be supplied to a part of the discharge fluid tube 100a, the part of the discharge fluid tube 100a being disposed on a downstream side extending from the first hydraulic pressure lock valve 220, that is, the hydraulic pressure lock valve 220 is a two-position switch valve configured to be switched between two positions, a first position 220a and a second position 220b, by the proportional valve 45. In other words, the first hydraulic pressure lock valve 220 is a valve configured to switch the pilot fluid to be supplied to or not to be supplied to the remote control valves 82A, 82B, 82C, and 82D, the remote control valves 82A, 82B, 82C, and 82D being configured to be operated in accordance with the swinging of the operation member 81.

A switch or the like disposed around the operator seat 13 allows an operation of the first hydraulic pressure lock valve 220 switched by the proportional valve 45. The control device 70 demagnetizes the solenoid of the proportional valve 45 when the switch is turned on. As the result, the proportional valve 45 is operated to switch the first hydraulic pressure lock valve 220 to the first position 220a, and thus the operation fluid is not supplied to a part of the discharge fluid tube 100a being disposed on a downstream side extending from the first hydraulic pressure lock valve 220. When the switch is tuned off, the control device 70 magnetically excites the solenoid of the proportional valve 45 to a certain magnetic magnitude allowing the first hydraulic pressure lock valve 220 to be switched to the second position 220b. In this manner, the first hydraulic pressure lock valve 220 is switched to the second position 220b, and thus the operation fluid is supplied to the part of the discharge fluid tube 100a being disposed on a downstream side extending from the first hydraulic pressure lock valve 220.

The load sensing system is a system configured to control a discharge amount of the first hydraulic pressure pump P1 on the basis of (depending on) a load of operation. The first hydraulic pressure pump P1 is a variable displacement axial pump employing a swash plate. The load sensing system includes a first detection fluid tube (a first detection fluid path) 250, a second detection fluid tube (a second detection fluid path) 251, a flow rate compensation valve 252, and a swash plate controller 253.

The first detection fluid tube 250 (hereinafter also referred to as a PLS fluid tube) is connected to the control valves 80A, 80B, and 80C, and is a fluid tube (a fluid path) configured to detect a load pressure applied when the control valves 80A, 80B, and 80C are in operation. In addition, the first detection fluid tube 250 is connected also to the flow rate compensation valve 252, and transmits a "PLS signal pressure" to the flow rate compensation valve 252, the "PLS signal pressure" being the highest load pressure of the load pressures applied to the control valves 80A, 80B, and 80C. The second detection fluid tube 251 (hereinafter also referred to as a PPS fluid tube) connects the flow rate compensation valve 252 and a discharge side of the first hydraulic pressure pump P1 to each other, and transmits a "PPS signal pressure" to the flow rate compensation valve 252, the "PPS signal pressure" being a pressure (a discharge pressure) of the operation fluid discharged from the first hydraulic pressure pump P1.

The swash plate controller 253 is a device including: a piston configured to be moved by a hydraulic pressure; a housing portion configured to house the piston; and a rod connected to the piston. One end side of the housing portion is connected to the flow rate compensation valve 252, and the other end side of the housing portion is connected to the discharge side of the first hydraulic pressure pump P1. The rod (a moving portion) of the swash plate controller 253 is connected to the swash plate of the first hydraulic pressure pump P1, and thus an angle of the swash plate can be changed by stretching and shortening of the rod.

The flow rate compensation valve 252 is a valve configured to control the swash plate controller 253 on the basis of (depending on) the PLS signal pressure and the PPS signal pressure. The flow rate compensation valve 252 applies a pressure to one end side of the swash plate controller 253 so that a pressure difference (a first differential pressure) between the PPS signal pressure and the PLS signal pressure can be a pressure preliminarily determined. In particular, the flow rate compensation valve 252 stretches and shortens the rod disposed on the other end side of the swash plate controller 253 so that the differential pressure (the first differential pressure) between the PPS signal pressure and the PLS signal pressure can be constant. Meanwhile, the first differential pressure in the flow rate compensation valve 252 is set by a spring 252a disposed on the flow rate compensation valve 252. That is, the flow rate compensation valve 252 is set to provide the constant first differential pressure by a spool pushed by the spring 252a, the spool being incorporated in the flow rate compensation valve 252.

As described above, the load sensing system changes an angle of the swash plate to provide the constant first differential pressure, and thereby adjusting a discharge amount of the first hydraulic pressure pump P1 on the basis of (depending on) a load pressure.

The power control system is a device configured to control the first hydraulic pressure pump P1 on the basis of (depending on) a differential pressure (a second differential pressure: PA-Pi) between: a first pressure (Pi) that is a pressure of the operation fluid (the pilot fluid) discharged from the second hydraulic pressure pump P2; and a second pressure (PA) that is a pressure of the operation fluid (the pilot fluid) after reduction of the flow rate discharged from the second hydraulic pressure pump P2.

The power control system includes a differential pressure operation unit 261. The differential pressure operation unit 261 is a device configured to operate on the basis of (depending on) the second differential pressure between the first pressure and the second pressure. The differential pressure operation unit 261 includes a piston 261a, a housing portion 261b, and a rod 261c, the piston 261a being configured to move on the basis of (depending on) the second differential pressure, the housing portion 261b being configured to house the piston 261a, and the rod 261c being configured to move in synchronization with the moving of the piston 261a.

One end of a first outlet fluid tube (a first outlet fluid path) 255 is connected to a bottom side of the differential pressure operation unit 261, and one end of a second outlet fluid tube (a second outlet fluid path) 256 is connected to a rod side of the differential pressure operation unit 261. The other end of the first outlet fluid tube 255 and the other end of the second outlet fluid tube 256 are connected to a downstream side of the proportional valve 45 in the third supply tube 100d. Meanwhile, each of the first outlet fluid tube 255 and the second outlet fluid tube 256 is a part of the third supply tube 100d.

A throttle (a restrictor) 257 is disposed on a portion between the other end of the first outlet fluid tube 255 and the other end of the second outlet fluid tube 256. A bleed circuit is disposed on a downstream side of the throttle 257, that is, on a portion between the throttle 257 and the second outlet fluid tube 256.

The first pressure (Pi) is a pressure of the operation fluid flowing in the first outlet fluid tube 255, and the second pressure (PA) is a pressure of the operation fluid flowing in the second outlet fluid tube 256. In the power control system, the piston 261a of the differential pressure operation unit 261 moves toward a direction for stretching the rod 261c when the first pressure is higher than the second pressure, and the piston 261a of the differential pressure operation unit 261 moves toward a direction for shortening the rod 261c when the second pressure is higher than the first pressure. And, the rod 261c is connected to the flow rate compensation valve 252, and the rod 261c is capable of moving the spool against the spring 252a. That is, the aperture of the flow rate compensation valve 252 can be changed by the rod 261c. According to the power control system, the aperture of the flow rate compensation valve 252 is changed on the basis of (depending on) the second differential pressure, and thus an output of the first hydraulic pressure pump P1 can be changed on the basis of (depending on) the second differential pressure.

As shown in FIG. 12, a bleed circuit 201 is connected to a portion between the proportional valve 45 and the fluid tubes (the first outlet fluid tube 255 and the second outlet fluid tube 256) constituting the power control system. The bleed circuit 201 according to the embodiment includes the discharge fluid tube 201a and the throttle 201b, the discharge fluid tube 201a being disposed on a section extending from the branching portion 101 of the third supply tube 100d to the first outlet fluid tube 255, the throttle 201b being disposed on the discharge fluid tube 201a. As described above, the disposing of the bleed circuit 201 allows the pressure applied to the differential pressure operation unit 261 to be lower than the pressure applied to the first hydraulic pressure lock valve 220, the differential pressure operation unit 261 serving as the second hydraulic pressure controller, the first hydraulic pressure lock valve 220 serving as the first hydraulic pressure controller. In particular, the proportional valve 45 applies a pressure higher than a predetermined pressure to the differential pressure operation unit 261 of the power control system after switching the first hydraulic pressure lock valve 220 from the first position 220a to the second position 220b, and thus the power control system can be operated.

Meanwhile, the measurement device applied to the second hydraulic pressure controller (the differential pressure operation unit 261) may be provided also in the sixth embodiment.

Seventh Embodiment

Figure 13:
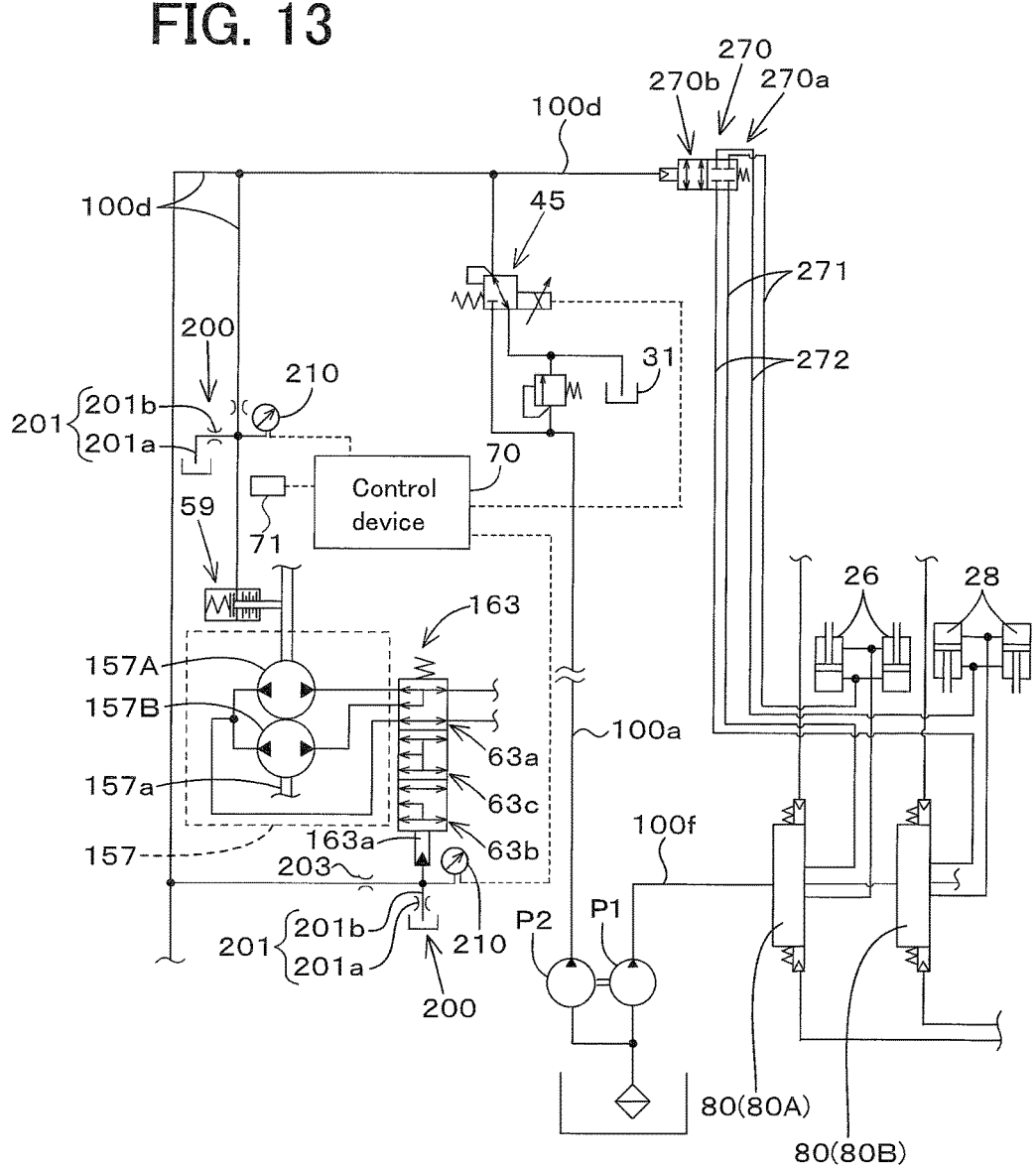
FIG. 13 is a view showing a hydraulic system according to a seventh embodiment of the present invention.

FIG. 13 shows a hydraulic system according to a seventh embodiment of the present invention. In the embodiment described above, the proportional valve 45 controls the two hydraulic pressure controllers. However, in the seventh embodiment, the proportional valve 45 controls the three hydraulic pressure controllers. The seventh embodiment employs the brake mechanism 59, the first hydraulic pressure switch valve 163, and a shut valve 270 as the three hydraulic pressure controllers. In the present invention, a combination of the hydraulic pressure controllers is not limited to the hydraulic pressure controllers described in the seventh embodiment, and all combinations of the hydraulic pressure controllers described in all of the embodiments can be applied to the seventh embodiment.

The proportional valve 45 and the shut valve 270 are connected to each other by the third supply tube 100d, the proportional valve 45 and the brake mechanism 59 are connected to each other by the third supply tube 100d, and the proportional valve 45 and the first hydraulic pressure switch valve 163 are connected to each other by the third supply tube 100d.

In the third supply tube 100d, the differential pressure unit 200 is disposed on a section for connecting the proportional valve 45 and the brake mechanism 59 to each other and on a section for connecting the proportional valve 45 and the first hydraulic pressure switch valve 163 to each other.

The shut valve 270 is a valve configured to switch the operation fluid to be flown or not to be flown between the control valve 80 and the hydraulic actuator (for example, the hydraulic cylinder). The shut valve 270 is a two-position switch valve configured to be switched between two positions, a first position 270a and a second position 270b, by the proportional valve 45. The shut valve 270 is disposed on an intermediate portion in a fluid tube (a fluid path) 271 connecting the boom control valve 80A and the lift cylinder 26 to each other and on an intermediate portion in a fluid tube (a fluid path) 272 connecting the bucket control valve 80B and the tilt cylinder 28 to each other.

As described above, according to a modified example shown in FIG. 13, the intermediate portions of the fluid tubes 271 and 272 are blocked (shut off) by the shut valve 270 when the shut valve 270 is in the first position 270a. That is, the shut valve 270 is in a blocked state where the operation fluid is not supplied to the hydraulic cylinder (the lift cylinder 26 and the tilt cylinder 28) when being in the first position 270a. After setting the blocked state, the shut valve 270 can be opened when the proportional valve 45 sets the pilot pressure to a switching pressure (an operation pressure) at which the shut valve 270 is switched from the first position 270a to the second position 270b, the pilot pressure being applied to the shut valve 270. In this manner, the intermediate portion of the fluid tube 271 is continuously communicated, the intermediate portion of the fluid tube 272 is also continuously communicated, and thus a supply state (a communicated state) where the operation fluid is supplied from the control valves 80 (the boom control valve 80A and the bucket control valve 80B) to the hydraulic cylinder (the lift cylinder 26 and the tilt cylinder 28) is established.

Then, the braking can be released when the aperture of the proportional valve 45 is changed to set the pilot pressure to the braking releasing pressure or more, the pilot pressure being applied to the third hydraulic pressure switch valve 59B. In addition, the second speed can be set when the aperture of the proportional valve 45 is changed to set the pilot pressure to the second speed switching pressure or more, the pilot pressure being applied to the second hydraulic pressure controller 163.

Meanwhile, in the embodiment, the hydraulic cylinder is exemplified as the hydraulic actuator. However, anything serving as the hydraulic actuator may be employed.

Eighth Embodiment

Figure 14A:
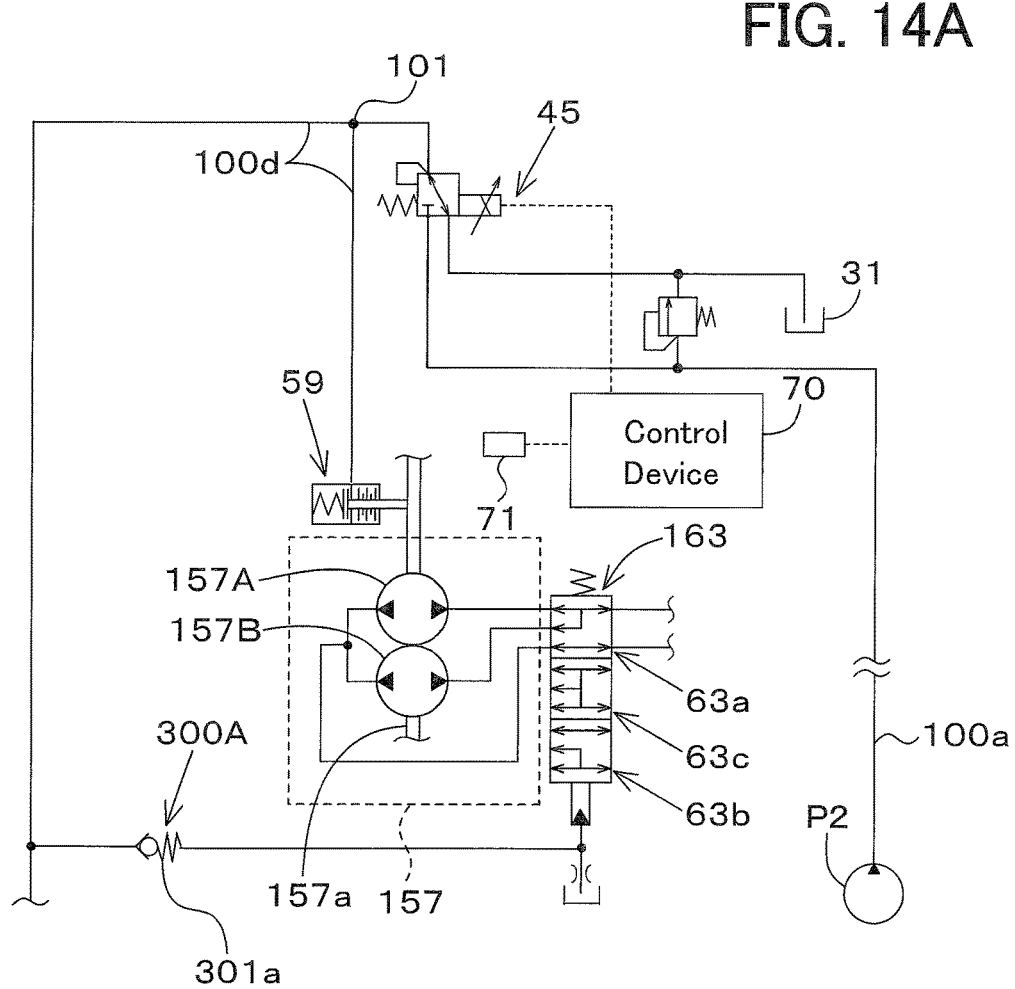
FIG. 14A is a first view showing a hydraulic system according to an eighth embodiment of the present invention.
Figure 14B:
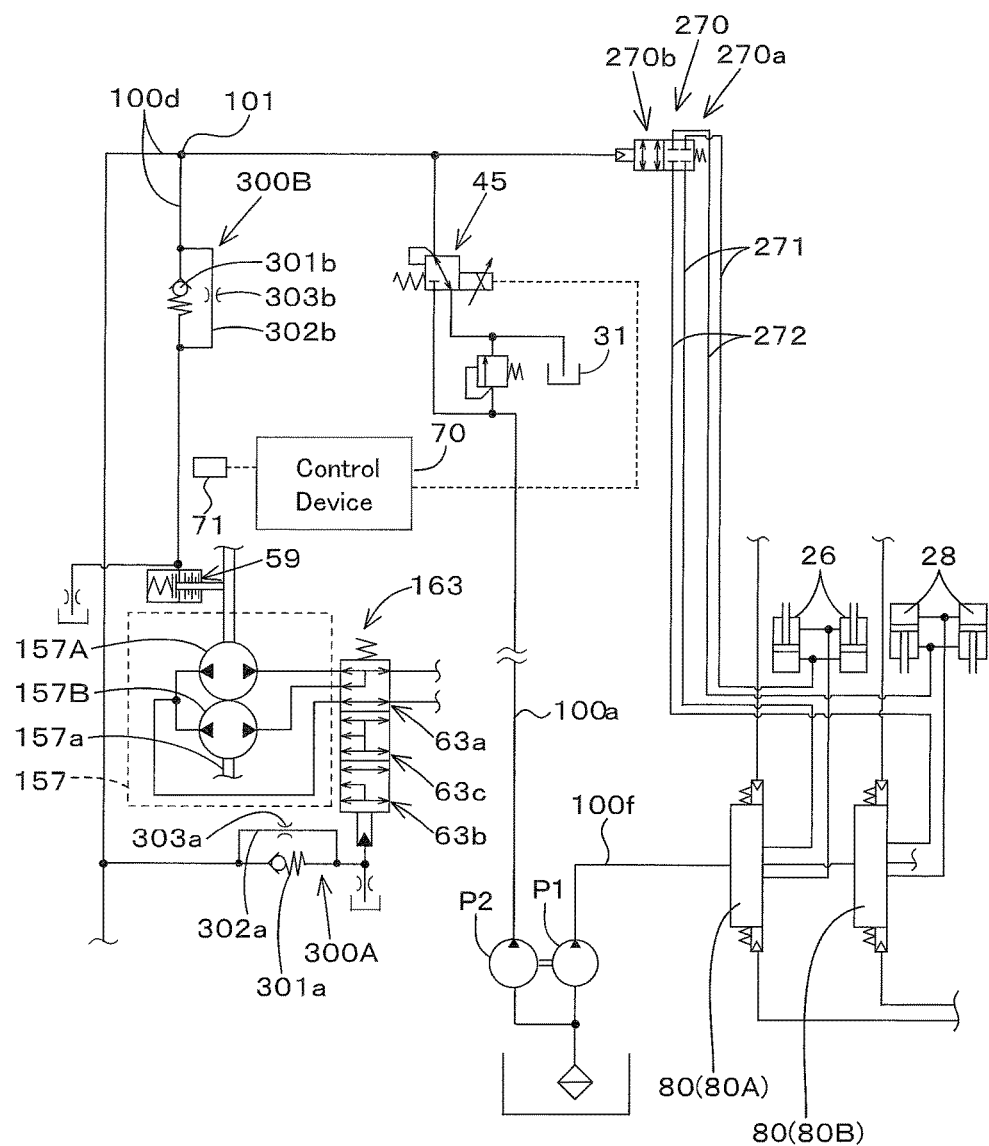
FIG. 14B is a second view showing the hydraulic system according to the eighth embodiment.
Figure 14C:
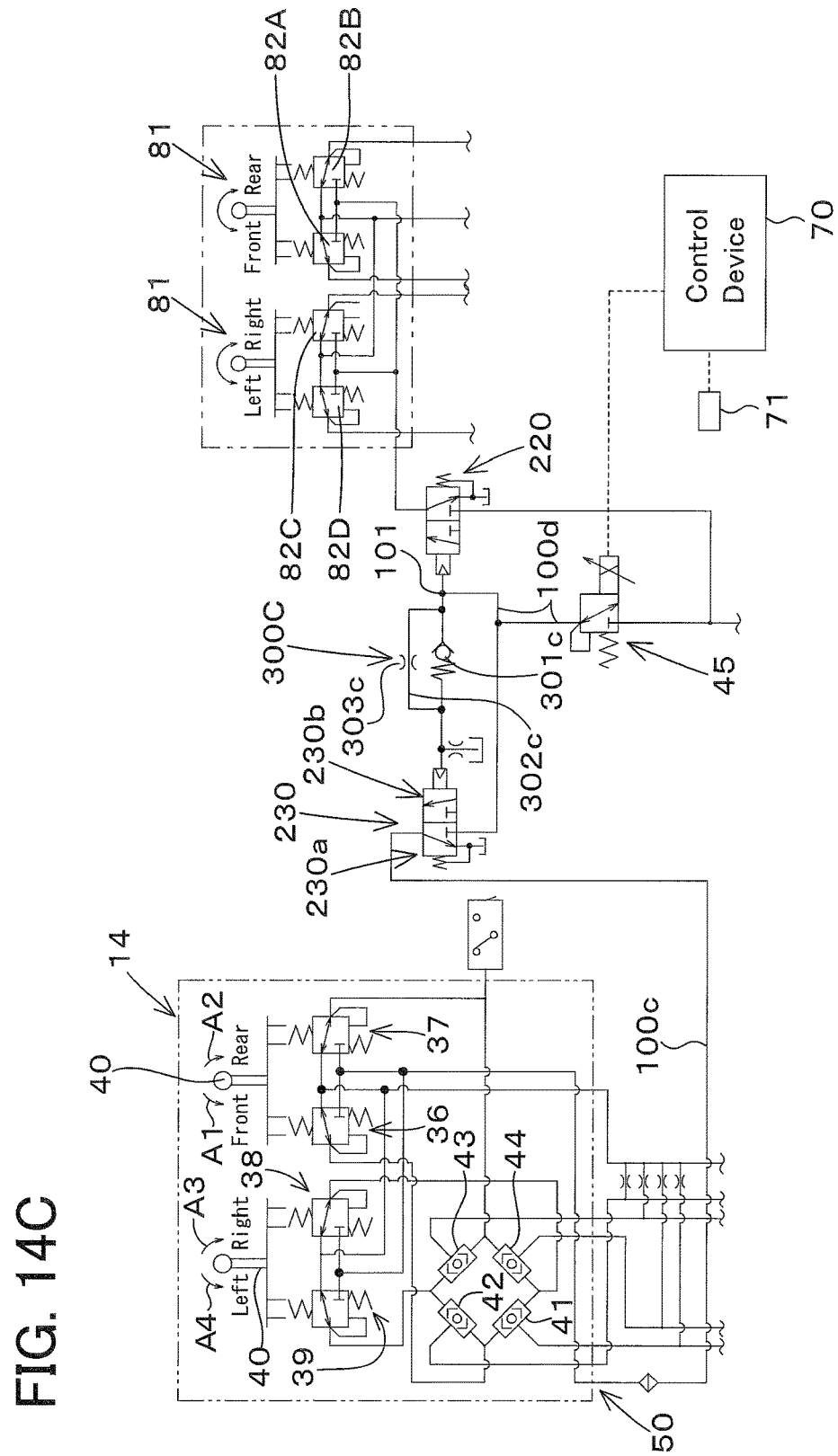
FIG. 14C is a third view showing the hydraulic system according to the eighth embodiment.

FIG. 14A to FIG. 14C show a hydraulic system according to an eighth embodiment of the present invention. The hydraulic system according to the eighth embodiment is a system employing a set pressure unit in the hydraulic system described in the embodiments mentioned above. In the following description, explanations of the configuration similar to that of the embodiments mentioned above will be omitted.

A pressure setting unit is configured to set a differential pressure to a pressure preliminarily determined, the differential pressure being a difference between a pressure given to (a pressure applied to) the first hydraulic pressure controller and a pressure given to (a pressure applied to) the second hydraulic pressure controller. FIG. 14A shows a first example employing a setting unit 300A, FIG. 14B shows a second example employing the setting unit 300A and a setting unit 300B, and FIG. 14C shows a third example employing a setting unit 300C.

As shown in FIG. 14A, the brake mechanism 59 and the first hydraulic pressure switch valve 163 are employed as the hydraulic pressure controller controlled by the proportional valve 45. The set pressure unit 300A is configured to set a differential pressure to a pressure preliminarily determined, the differential pressure being a difference between a pressure applied to the brake mechanism 59 (the first hydraulic pressure controller) and a pressure applied to the first hydraulic pressure switch valve 163 (the second hydraulic pressure controller).

In particular, the set pressure unit 300A includes a check valve (a differential pressure check valve) 301a. The check valve 301a is disposed on a section extending from the branching portion 101 of the third supply tube 100d to the first hydraulic pressure switch valve 163. The check valve 301a allows the operation fluid to flow toward the first hydraulic pressure switch valve 163. A setting pressure of the check valve 301a may be set to a switching pressure (an operation pressure) or more, the switching pressure allowing the first hydraulic pressure switch valve 163 to be switched from the first position 63a to the second position 63b, and may be set to be lower than the operation pressure.

Accordingly, the first hydraulic pressure switch valve 163 can be operated by a pressure set as the setting pressure of the check valve 301a after the brake mechanism 59 is activated, and thus the first hydraulic pressure switch valve 163 can be stably operated. For example, in the first hydraulic pressure switch valve 163, a switching pressure for switching from the first position 63a to the neutral position 63c is set to 0.5 MPa, a switching pressure for switching from the neutral position 63c to the second position 63b is set to 1.0 MPa, the braking releasing pressure of the brake mechanism 59 is set to 0.5 MPa, a setting pressure of the check valve 301a is set to 0.3 MPa. In that case, the pressure of the proportional valve 45 for activating the brake mechanism 59 is set to 0.5 MPa to 0.79 MPa, the pressure of the proportional valve 45 for switching the first hydraulic pressure switch valve 163 from the first position 63a to the neutral position 63c is set to 0.8 MPa to 1.29 MPa, the pressure of the proportional valve 45 for switching the first hydraulic pressure switch valve 163 from the neutral position 63c to the second position 63b is set to 1.3 MPa or more, and thus the brake mechanism 59 and the first hydraulic pressure switch valve 163 can be operated. Meanwhile, the pressures such as the switching pressures are concrete values for explanation, and accordingly are not limited to the concrete values.

In addition, the setting pressure of the check valve 301a may be set to 1 MPa, and an internal diameter (a throttle diameter) of the throttle of the bleed circuit may be set to φ1.0 mm, the throttle being disposed on a side of the pressure receiver 163a of the first hydraulic pressure switch valve 163. The setting pressure of the check valve 301a and the throttle diameter of the bleed circuit are not limited to the examples, and are set by a pressure receiving characteristic and the like (an operation pressure and the like) of the first hydraulic pressure switch valve 163.

As shown in FIG. 14B, the brake mechanism 59, the first hydraulic pressure switch valve 163, and the shut valve 270 are employed as the hydraulic pressure controller controlled by the proportional valve 45. Of the set pressure unit 300A and the set pressure unit 300B shown in FIG. 14B, the set pressure unit 300A includes the check valve (the differential pressure check valve) 301a, a bypass circuit 302a, and a throttle 303a. The check valve 301a is disposed on a section between the first hydraulic pressure switch valve 163 and the branching portion 101 of the third supply tube 100d. The bypass circuit 302a bypasses a path between an upper stream side of the check valve 301a and a downstream side of the check valve 301a. The throttle 303a is disposed on the bypass circuit 302a. An internal diameter (a throttle diameter) of the throttle 303a is set to be within a range where the check valve 301a can be activated.

The set pressure unit 300B sets a differential pressure to a pressure preliminarily determined, the differential pressure being a difference between: a pressure applied to the brake mechanism 59; a pressure applied to the first hydraulic pressure switch valve 163; and a pressure applied to the shut valve 270. The set pressure unit 300B includes a check valve (a differential pressure check valve) 301b, a bypass circuit 302b, and a throttle 303b. The check valve 301b is disposed on a section between the branching portion 101 and the brake mechanism 59. The bypass circuit 302b bypasses a path between an upper stream side of the check valve 301b and a downstream side of the check valve 301b. The throttle 303b is disposed on the bypass circuit 302b.

The check valve 301b allows the operation fluid to flow toward the brake mechanism 59. A setting pressure of the check valve 301b may be set to the braking releasing pressure (an operation pressure) of the brake mechanism 59 or more, and may be set to be lower than the braking releasing pressure.

Accordingly, after the shut valve 27 is operated, the brake mechanism 59 can be activated by a pressure set as a setting pressure of the check valve 301b or more. In addition, after the brake mechanism 59 is activated, the first hydraulic pressure switch valve 163 can be activated by the pressure set as a setting pressure of the check valve 301a or more. That is, the brake mechanism 59, the first hydraulic pressure switch valve 163, and the shut valve 270 can be stably activated.

Meanwhile, in FIG. 14B, the bypass circuits 302a and 302b and the throttles 303a and 303b are disposed on the set pressure unit 300A and the set pressure unit 300B. However, the bypass circuit and the throttle are not necessarily required to be disposed as shown in FIG. 14A.

As shown in FIG. 14C, a first hydraulic pressure lock valve 220 and a second hydraulic pressure lock valve 230 are employed as the hydraulic pressure controller controlled by the proportional valve 45. The proportional valve 45 is connected to the first hydraulic pressure lock valve 220 and to the second hydraulic pressure lock valve 230 through the third supply tube 100d.

The second hydraulic pressure lock valve 230 is an electromagnetic valve configured to switch the operation fluid to be supplied to or not to be supplied to the second supply tube 100c disposed on a downstream side extending from the second hydraulic pressure lock valve 230, that is, the second hydraulic pressure lock valve 230 is a two-position switch valve configured to be switched between two positions, a first position 230a and a second position 230b, by the proportional valve 45. In other words, the second hydraulic pressure lock valve 230 is a valve configured to switch the pilot fluid to be supplied to or not to be supplied to the remote control valves 36, 37, 38, and 39, the remote control valves 36, 37, 38, and 39 being configured to be operated in accordance with the swinging of the operation member 40.

The set pressure unit 300C includes a check valve (a differential pressure check valve) 301c, a bypass circuit 302c, and a throttle 303c. The check valve 301c is disposed on a section between the second hydraulic pressure lock valve 230 and the branching portion 101 of the third supply tube 100d. The bypass circuit 302c bypasses a path between an upper stream side of the check valve 301c and a downstream side of the check valve 301c. The throttle 303c is disposed on the bypass circuit 302c. Meanwhile, the bypass circuit 302c and the throttle 303c are disposed on the set pressure unit 300C in FIG. 14C. However, the bypass circuit and the throttle are not necessarily required to be disposed as shown in FIG. 14A.

The check valve 301c allows the operation fluid to flow toward the second hydraulic pressure lock valve 230. A setting pressure of the check valve 301c may be set to a switching pressure (an operation pressure) of the second hydraulic pressure lock valve 230 or more, and may be set to be lower than the operation pressure. Accordingly, after the first hydraulic pressure lock valve 220 is operated, the second hydraulic pressure lock valve 230 can be activated by a pressure set as a setting pressure of the check valve 301*c*. That is, the first hydraulic pressure lock valve 220 and the second hydraulic pressure lock valve 230 can be stably activated. Meanwhile, the proportional valve 45 can be activated as a valve for preventing an engine stall.

Ninth Embodiment

FIG. 15 shows a hydraulic system according to a ninth embodiment of the present invention. In the following description of the hydraulic system according to the ninth embodiment, explanations of the configuration similar to that of the embodiments mentioned above will be omitted.

Figure 15A:
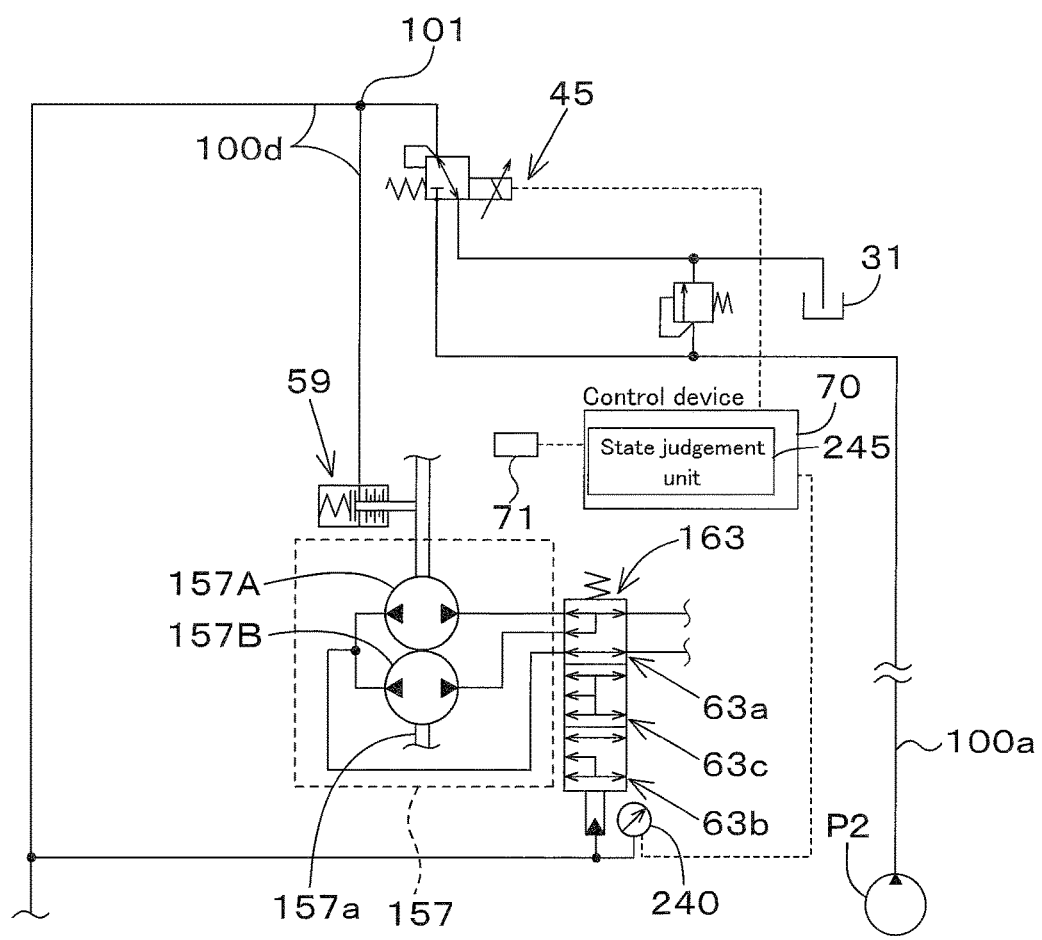
FIG. 15A is a view showing a hydraulic system according to a ninth embodiment of the present invention.

As shown in FIG. 15A, a measurement device 240 is connected to a fluid tube (a fluid path) following the branching portion 101 of the third supply tube 100*d*, that is, to an upper stream side of the second hydraulic pressure controller 163. The measurement device 240 is a device configured to measure a pressure of a secondary side of an electromagnetic valve. In particular, the measurement device 240 measures a pressure of the operation fluid (an output of the secondary side flowing in the third supply tube 100*d*), the operation fluid being outputted from the proportional valve 45 configured of an electromagnetic proportional valve. A pressure value measured by the measurement device 240 is inputted to the control device 70.

The control device 70 includes a state judgement unit 245. The state judgement unit 245 is configured of an electric circuit, an electronic circuit, a computer program, and the like included in the control device 70. The state judgement unit 245 judges whether the proportional valve 45 is out of order. In particular, the state judgement unit 245 judges whether the proportional valve 45 is out of order on the basis of a control signal (an electric current value) and a pressure (a measurement value), the control signal being outputted from the control device 70 to the solenoid of the proportional valve 45, the pressure being measured by the measurement device 240. As shown in FIG. 16, the state judgement unit 245 stores a relationship (a pressure-current characteristic) between an electric current value and a pressure of the operation fluid outputted from the proportional valve 45. The state judgement unit 245 compares a pressure measured by the measurement device 240 (hereinafter referred to as a measured pressure value) to an electric current value outputted from the control device 70 (hereinafter referred to as an outputted electric current value).

In a case where the relationship between the measured electric current value and the outputted pressure value is approximately identical to the electric current value and the pressure value each obtained from the pressure-current characteristic, the state judgement unit 245 judges that the proportional valve 45 is not out of order when a plotted point N1 determined depending on the measured electric current value and the outputted pressure value is within a judgement range (equal to or more than a line L2 and equal to or less than a line L3) including a characteristic line L1 showing the pressure-current characteristic as shown in FIG. 16, for example. Meanwhile, the judgement range is set on the basis of (depending on) a hysteresis characteristic, an error of the aperture of the proportional valve 45, and the like.

On the other hand, as shown in FIG. 16, the state judgement unit 245 judges that the proportional valve 45 is out of order when a plotted point N2 determined depending on the measured electric current value and the outputted pressure value is out of the judgement range. That is, in a case where the proportional valve 45 is out of order, the aperture of the proportional valve 45 is not enlarged even when the solenoid is magnetically excited. Accordingly, a pressure of the operation fluid is not increased, and the aperture of the proportional valve 45 is not changed in accordance with the magnetic excitation of the solenoid. In this manner, the state judgement unit 245 is capable of judging whether the proportional valve 45 is out of order on the basis of (depending on) the measured electric current value, the outputted pressure value, and the pressure-current characteristic.

Figure 15B:
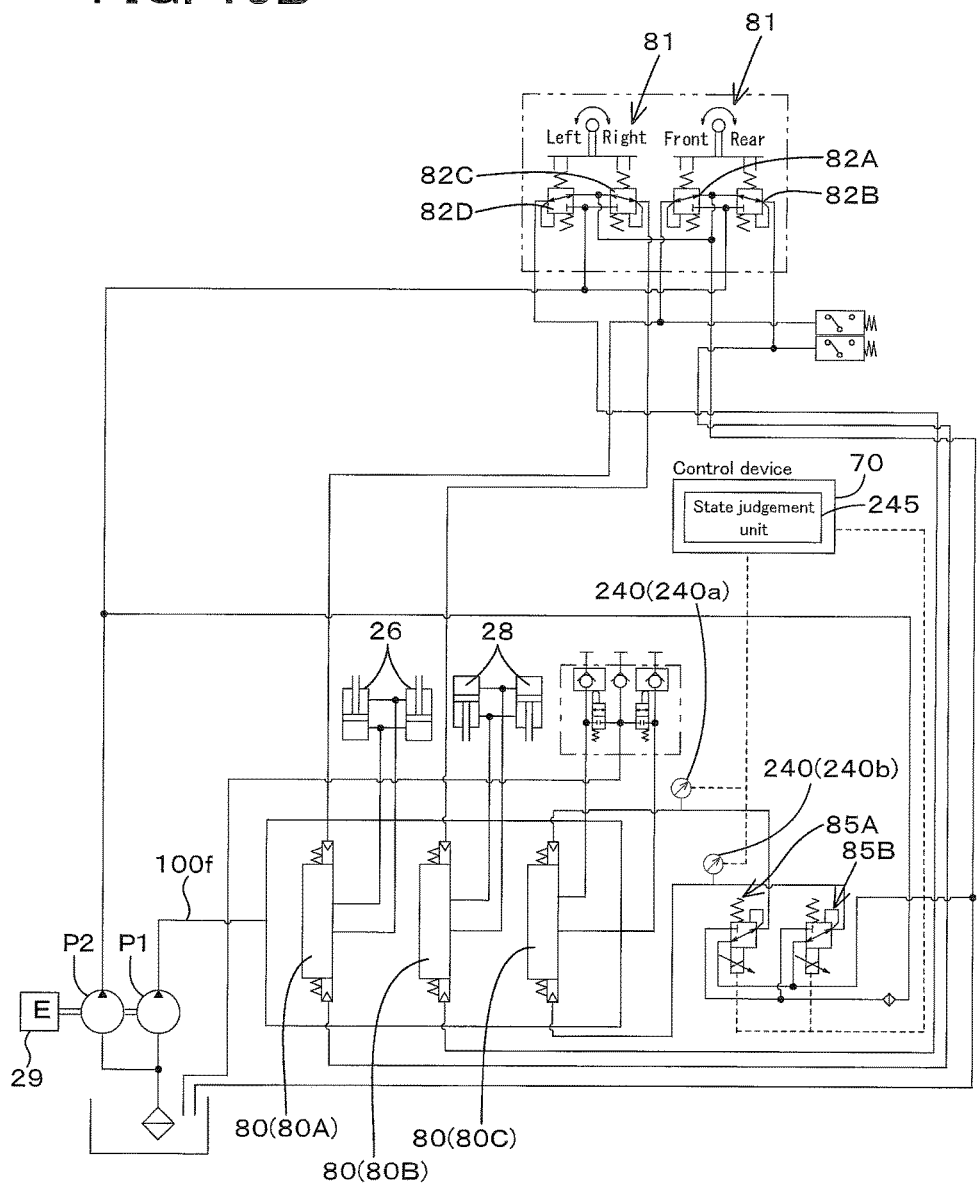
FIG. 15B is a view showing a modified example of the hydraulic system according to the ninth embodiment.

FIG. 15B shows a modified example of the ninth embodiment. In the embodiment described above, the measurement device 240 measures a pressure of the operation fluid at a downstream side (a secondary side) of the electromagnetic proportional valve (the proportional valve 45) configured to control the plurality of hydraulic pressure controllers. However, the measurement device 240 is not necessarily required to be a proportional valve configured to control the plurality of hydraulic pressure controllers. As shown in FIG. 15B, the measurement device 240 is disposed on the downstream sides of the electromagnetic valves (the first electromagnetic valve 85A and the second electromagnetic valve 85B). That is, the measurement 240 includes a first measurement device 240*a* and a second measurement device 240*b*, the first measurement device 240*a* being configured to measure a pressure of a secondary side of the first electromagnetic valve 85A, the second measurement device 240*b* being configured to measure a pressure of a secondary side of the second electromagnetic valve 85B.

The state judgement unit 245 judges whether the first electromagnetic valve 85A and the second electromagnetic valve 85B are out of order. In particular, the state judgement unit 245 judges whether the first electromagnetic valve 85A is out of order on the basis of a control signal (an electric current value) and a pressure (a measurement value), the control signal being outputted from the control device 70 to the solenoid of the first electromagnetic valve 85A, the pressure being measured by the first measurement device 240*a*. In addition, the state judgement unit 245 judges whether the second electromagnetic valve 85B is out of order on the basis of a control signal (an electric current value) and a pressure (a measurement value), the control signal being outputted from the control device 70 to the solenoid of the second electromagnetic valve 85B, the pressure being measured by the second measurement device 240*b*. The judgement method for judging whether the first electromagnetic valve 85A and the second electromagnetic valve 85B are out of order is similar to the above-described judgement method for the proportional valve 45, and the first electromagnetic valve 85A and the second electromagnetic valve 85B are read and understood as the configurations corresponding to the proportional valve 45.

In the above description, the embodiments of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

In the first embodiment to the third embodiment described above, the speed change by the first hydraulic pressure switch valve 63, the brake control by the brake mechanism 59, and the float control by the second hydraulic pressure switch valve 90 are explained. However, a combination of at least one of the speed change, the brake control, the float control, and the hydraulic pressure lock is not limited to the combinations described in the above mentioned embodiments.

What is claimed is:

1. A hydraulic system for a working machine, comprising:
a hydraulic pump to discharge an operation fluid;
a hydraulic device to be operated by the operation fluid;
a plurality of hydraulic pressure controllers, operation states of the plurality of hydraulic pressure controllers being changed based on a pressure of the operation fluid so as to control the hydraulic device; and
a proportional valve connected to the plurality of hydraulic pressure controllers, the proportional valve being configured to set a pressure of the operation fluid supplied to the hydraulic pressure controllers; and
an operation member, wherein
the hydraulic device includes:
a hydraulic actuator;
a control valve having a plurality of positions to change an operation state of the control valve based on a pressure of the operation fluid, the pressure being set by the operation member, thereby controlling the operation fluid flowing in the hydraulic actuator; and
a travel motor, and
the plurality of hydraulic pressure controllers each include:
a shut valve disposed between the hydraulic actuator and the control valve and configured to change the operation state due to the pressure of the operation fluid, thereby being switched to a supply state for supplying the operation fluid to the hydraulic actuator or to a blocked state for blocking the supplying of the operation fluid; and
a brake mechanism configured to change the operation state due to the pressure of the operation fluid, thereby braking the travel motor and releasing the braking.

2. A hydraulic system for a working machine, comprising:
a hydraulic pump to discharge an operation fluid;
a hydraulic device to be operated by the operation fluid;
a plurality of hydraulic pressure controllers, operation states of the plurality of hydraulic pressure controllers being changed based on a pressure of the operation fluid so as to control the hydraulic device; and
a proportional valve connected to the plurality of hydraulic pressure controllers, the proportional valve being configured to set a pressure of the operation fluid supplied to the hydraulic pressure controllers; and
an operation member, wherein
the hydraulic device includes:
a hydraulic actuator;
a control valve having a plurality of positions to change an operation state of the control valve based on a pressure of the operation fluid, the pressure being set by the operation member, thereby controlling the operation fluid flowing in the hydraulic actuator; and
a travel motor, and
the plurality of hydraulic pressure controllers each include:
a shut valve disposed between the hydraulic actuator and the control valve and configured to change the operation state due to the pressure of the operation fluid, thereby being switched to a supply state for supplying the operation fluid to the hydraulic actuator or to a blocked state for blocking the supplying of the operation fluid; and
a first hydraulic pressure switch valve configured to change the operation state due to the pressure of the operation fluid, thereby changing a speed of the travel motor.

3. A hydraulic system for a working machine, comprising:
a hydraulic pump to discharge an operation fluid;
a hydraulic device to be operated by the operation fluid;
a plurality of hydraulic pressure controllers, operation states of the plurality of hydraulic pressure controllers being changed based on a pressure of the operation fluid so as to control the hydraulic device; and
a proportional valve connected to the plurality of hydraulic pressure controllers, the proportional valve being configured to set a pressure of the operation fluid supplied to the hydraulic pressure controllers; and
an operation member, wherein
the hydraulic device includes:
a hydraulic cylinder configured to be stretched and shortened by the operation fluid, and
the plurality of hydraulic pressure controllers each include:
a control valve having a plurality of positions to change an operation state of the control valve based on a pressure of the operation fluid, the pressure being set by the operation member, thereby controlling the operation fluid flowing in the hydraulic actuator; and
a second hydraulic pressure switch valve configured to change an operation state of the second hydraulic pressure switch valve based on a pressure of the operation fluid, the pressure being set by the proportional valve, the second hydraulic pressure switch valve being configured to be switched to a third position for supplying the operation fluid to the hydraulic cylinder and to a fourth position for releasing the operation fluid of the hydraulic cylinder.

4. The hydraulic system for a working machine according to any one of claims 1, 2, and 3, comprising:
a remote control valve configured to change an aperture of the remote control valve to change a pressure of the operation fluid based on an operation of the operation member, the remote control valve being configured to supply, to the control valve, the operation fluid after the changing of the pressure, wherein
the proportional valve is connected to the remote control valve, the proportional valve being configured to supply the operation fluid to the remote control valve.

5. The hydraulic system for a working machine according to claim 4, wherein
the proportional valve stops supplying the operation fluid to the control valve and to the remote control valve.

6. The hydraulic system for a working machine according to any one of claims 1, 2, and 3, comprising:
a pressure measurement device configured to measure a pressure of the operation fluid, the pressure being applied to the control valve; and
a control device configured to control the proportional valve based on the pressure measured by the pressure measurement device.

7. A working machine comprising:
the hydraulic system according to any one of claims 1, 2, and 3.

8. A hydraulic system for a working machine, comprising:
a hydraulic pump to discharge an operation fluid;
a hydraulic device to be operated by the operation fluid;

a plurality of hydraulic pressure controllers each to control the hydraulic device;

a proportional valve connected to the plurality of hydraulic pressure controllers, the proportional valve being configured to set a pressure of the operation fluid supplied to the hydraulic pressure controllers; and a differential pressure unit configured to make a difference between: a pressure applied to a first hydraulic pressure controller that is arbitrary one of the plurality of hydraulic pressure controllers; and a pressure applied to a second hydraulic pressure controller different from the first hydraulic pressure controller, the differential pressure unit including:

a bleed circuit disposed on a fluid tube connecting the proportional valve and the second hydraulic pressure controller to each other; and a throttle disposed on an upper stream side of the bleed circuit.

* * * * *